(12) United States Patent
Chung et al.

(10) Patent No.: US 7,561,724 B2
(45) Date of Patent: Jul. 14, 2009

(54) REGISTRATION METHOD, AS FOR VOTING

(75) Inventors: Kevin Kwong-Tai Chung, Princeton, NJ (US); Xiaoming Shi, Highland Park, NJ (US)

(73) Assignee: AI Technology, Princeton Junction, NJ (US)

( * ) Notice: Subject to any disclaimer, the term of this patent is extended or adjusted under 35 U.S.C. 154(b) by 940 days.

(21) Appl. No.: 10/999,589

(22) Filed: Nov. 30, 2004

(65) Prior Publication Data
US 2005/0092835 A1    May 5, 2005

Related U.S. Application Data

(63) Continuation of application No. 10/208,926, filed on Jul. 30, 2002, now Pat. No. 7,197,167, which is a continuation-in-part of application No. 10/127,793, filed on Apr. 22, 2002, now Pat. No. 6,694,045.

(60) Provisional application No. 60/309,639, filed on Aug. 2, 2001, provisional application No. 60/310,281, filed on Aug. 6, 2001, provisional application No. 60/317, 101, filed on Sep. 4, 2001, provisional application No. 60/323,514, filed on Sep. 19, 2001, provisional application No. 60/326,265, filed on Oct. 1, 2001, provisional application No. 60/341,633, filed on Dec. 19, 2001, provisional application No. 60/351,266, filed on Jan. 23, 2002, provisional application No. 60/352,901, filed on Jan. 30, 2002, provisional application No. 60/359,558, filed on Feb. 22, 2002, provisional application No. 60/366,061, filed on Mar. 19, 2002.

(51) Int. Cl.
*G06K 9/00* (2006.01)
*G06K 9/68* (2006.01)
(52) U.S. Cl. .................................. 382/119; 382/218

(58) Field of Classification Search ................. 382/115, 382/119, 124, 209, 218; 283/69; 340/5.1, 340/5.2, 5.21, 5.53; 705/12; 235/386; 713/186; 902/3, 5
See application file for complete search history.

(56) References Cited

U.S. PATENT DOCUMENTS 4,373,134 A    2/1983 Grace et al.

(Continued)

FOREIGN PATENT DOCUMENTS

WO    WO99/52058    10/1999

OTHER PUBLICATIONS

"Touchvote", Surveys International. ACCEEEO Conference, Information Technology in Elections Warsaw, Poland, Jun. 14-16, 2000, 2 Pages.

(Continued)

*Primary Examiner*—Daniel G Mariam
(74) *Attorney, Agent, or Firm*—Clement A. Berard, Esq.; Dann, Dorfman, Herrell & Skillman, PC

(57) ABSTRACT

A method for registration comprises providing a computer and a server in communication via a network, an intranet and/or the Internet, and entering data into the computer for communication to the server. The communicated data is compared to a database to detect duplication and optionally for validation. The registration method may be utilized for voter or other registration, for changing or updating a registration, and/or for another transaction.

45 Claims, 10 Drawing Sheets

U.S. PATENT DOCUMENTS

| | | | |
|---|---|---|---|
| 4,641,240 | A | 2/1987 | Boram |
| 5,189,288 | A | 2/1993 | Anno et al. |
| 5,218,528 | A | 6/1993 | Wise et al. |
| 5,278,753 | A | 1/1994 | Graft, III |
| 5,758,325 | A | 5/1998 | Lohry et al. |
| 5,875,432 | A | 2/1999 | Sehr |
| 5,878,399 | A | 3/1999 | Peralto |
| 6,081,793 | A | 6/2000 | Challener et al. |
| 6,307,956 | B1 * | 10/2001 | Black ............... 382/124 |
| 6,412,692 | B1 | 7/2002 | Miyagawa |
| 2001/0035455 | A1 | 11/2001 | Davis et al. |
| 2002/0074399 | A1 | 6/2002 | Hall et al. |
| 2002/0084325 | A1 | 7/2002 | Reardon |
| 2002/0138341 | A1 * | 9/2002 | Rodriguez et al. ......... 705/12 |
| 2002/0169756 | A1 * | 11/2002 | Biddulph ............ 707/3 |
| 2003/0023478 | A1 * | 1/2003 | Piccionelli ........... 705/12 |

OTHER PUBLICATIONS

"Hart Intercivic", Voter Registration, http://www.worldwideelection.com/solutions/registration.html, Printed Jul. 29, 2002, 2 Pages.

"Hart Intercivic", Solutions, eSlate Electronic Voting System, http://www.worldwideelection.com/solutions/eslate.html, Printed Jul. 29, 2002, 2 Pages.

Terry Costlow, "Computer Kiosk Expedites Voter Registration," IEE Spectrum, Oct. 2002, 2 Pages.

Hart Interactive, "eSlate Electronic Voting System," http://www.worldwideelection.com/GoveSlate.cfm, 1998-2000, 2 Pages.

Robert Wright, "Recasting The Voting Process," www.varbusiness.com, Mar. 5, 2001, 4 Pages.

CALTECH-MIT, "Voting What Is What Could Be," Jul. 2001, 95 Pages.

Faulkner & Gray, 1998 Advanced Card Technology Sourcebook, 1997, ISBN 1-57987-009-0, pp. 146-154.

International Search Report, PCT/US02/24358, Jul. 28, 2003, 4 Pages.

* cited by examiner

REGISTRATION METHOD, AS FOR VOTING

This Application is a continuation of U.S. patent application Ser. No. 10/208,926 filed on Jul. 30, 2002 (now U.S. Pat. No. 7,197,167 issued on Mar. 27, 2007), which is continuation-in-part of U.S. patent application Ser. No. 10/127,793 filed Apr. 22, 2002 (now U.S. Pat. No. 6,694,045 issued on Feb. 17, 2004) and claims the benefit of the priority of:

U.S. Provisional Application Ser. No. 60/309,639 filed Aug. 2, 2001,
U.S. Provisional Application Ser. No. 60/310,281 filed Aug. 6, 2001,
U.S. Provisional Application Ser. No. 60/317,101 filed Sep. 4, 2001,
U.S. Provisional Application Ser. No. 60/323,514 filed Sep. 19, 2001,
U.S. Provisional Application Ser. No. 60/326,265 filed Oct. 1, 2001,
U.S. Provisional Application Ser. No. 60/341,633 filed Dec. 19, 2001,
U.S. Provisional Application Ser. No. 60/351,266 filed Jan. 23, 2002,
U.S. Provisional Application Ser. No. 60/352,901 filed Jan. 30, 2002,
U.S. Provisional Application Ser. No. 60/359,558 filed Feb. 22, 2002, and
U.S. Provisional Application Ser. No. 60/366,061 filed Mar. 19, 2002.

The present invention relates to registration and, in particular, to an apparatus and method therefor.

Registration, for example, of citizens to vote in elections has traditionally been accomplished by the voter appearing before an appropriate official, such as a government official, at the appropriate registration place, such as a government office, providing identification and evidence of eligibility to register, to vote, and the filling out of a paper registration application and/or other form. With respect to voting, for example, recent interest in encouraging eligible citizens to register and vote has produced mail-in registration forms, such as the Federal Post Card Application (FPCA), as well as a desire for registration by computer via the Internet.

Inherent in all such arrangements is the need for appropriate security and verification. Firstly, there is the need to verify the information and identity of the person seeking to register to vote. Later, a voter usually must produce identification and provide a signature for comparison to the registration record by election officials at the polling place before being permitted to vote in an election. With the prospect of computerized registration, and particularly computerized registration via the Internet, there arises the possibility of hackers, attackers and other ill-intended people registering falsely and/or more than once. e.g., as the same person in plural voting districts or registering with plural identities in one or more voting districts.

A further burden for election officials beyond the processing of new registrations arises due to changes in registration information for existing registered voters. In particular, voters move their residences both within an election district and from one district to another, get married and divorced and so change their names. In addition to the cost and the burden to election staff of processing each such change individually year after year is the added burden caused by the fact that many of such changes are reported to the election officials only a short time before an election. In any election, the workload of election officials is further increased by the need to handle and count absentee ballots and to handle, verify and count provisional ballots (i.e. where a person's entitlement to vote is in question, but the person is permitted to vote "provisionally" subject to verification of the person's right to vote after the election and before the election result is finalized and certified.

Accordingly, there is a need for a voting registration apparatus and method that can be utilized to alleviate at least some of the workload of and/or burden on election officials arising from any one or more of the foregoing problems. It would further be desirable if such apparatus and method is capable of permitting access to registration information and the updating of registration information substantially in "real time."

To this end, the method of the present invention comprises providing a computer and a server in communication via a network, an intranet and/or the Internet, entering data into the computer, and communicating the data to the server. The communicated data is compared to data stored in at least two data fields of a database for detecting a duplicate or a change to an existing registration, and is compared to data stored in at least one other database for detecting a duplicate, and/or for validating the communicated data. If the communicated data is not a duplicate, then communicated data is stored in the database for making a registration or changing an existing registration. If the communicated data is a duplicate, then the communicated data is not stored in the database.

BRIEF DESCRIPTION OF THE DRAWING

The detailed description of the preferred embodiments of the present invention will be more easily and better understood when read in conjunction with the FIGURES of the Drawing which include.

Figure 1:
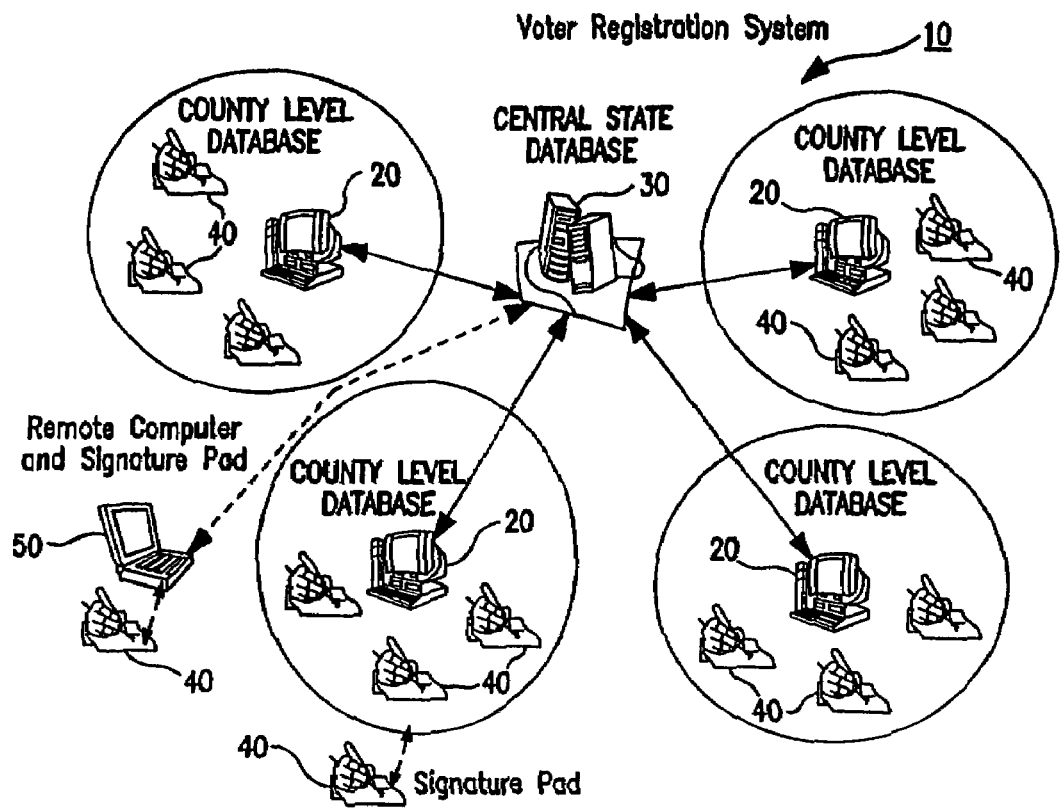
FIG. 1 is a schematic diagram representation of a voter registration system.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. It is noted that, according to common practice, the various features of the drawing are not to scale, and the dimensions of the various features are arbitrarily expanded or reduced for clarity.

DESCRIPTION OF THE PREFERRED EMBODIMENTS

Registration of voters is a prerequisite to conducting a properly organized election and so is performed in advance with appropriate verification of a prospective voter's eligibility to vote and his identity, all as typically prescribed by the applicable election laws and/or regulations. The information collected from each voter, including an identifying signature, must be recorded, stored and retrieved as needed to the conducting of an election. This presents a great administrative burden on election officials, not only in initially registering persons to vote, but also in maintaining voter registration information as voters move their residence into, out of and within any given voting jurisdiction, die, change their name, declare and/or change political party affiliation, and the like. In practice, many registrations and changes thereto tend to occur shortly before an election, thereby increasing the burden on election officials.

In the United States, the Election Reform Task Force Recommendations of the National Conference of State Legislatures (NCSL) have identified three levels of functionality desirable for statewide voter registration and Ai Technology, Inc. of Princeton Junction, N.J., has identified two additional levels, as follows Level 1—States should develop a statewide, electronic registration database (NCSL Recommendation 3.1), Level 2—Registration databases should be constantly maintained (NCSL Recommendation 3.2), Level 3—Registration databases should be easily accessible from all polling places (NCSL Recommendation 3.3), Level 4—Voters should be able to sign-in with a digitized signature on an electronic voter roll at all polling places, and Level 5—Voter signatures should be authenticated with signatures in the registration database at all polling places on the day of election in real time and with a fail-safe backup system.

Apparatus and method is described herein that can provide any one or more or all of the these five levels of functionality, as desired. In addition, the apparatus and method described provides for automated authentication of digitized signatures so that the need for skill and expertise on the part of election workers at the polling places is at least greatly reduced, if not removed. A fail-safe backup may be provided by any one or more of off-site storage of duplicative files and/or by storing applicable files on CD-ROMs or other portable media that may be sent or taken to various election sites, such as government offices and/or polling places.

FIG. 1 is a schematic diagram representation of a voter registration system 10 wherein a plurality of regional or county level computers 20 including respective regional or county level databases of voter and registration information are in communication with a central or state computer 30 and database of voter and registration information. Each of the regional or county level computers and databases includes an associated identity verifying arrangement, preferably a biometric characteristic of a user/voter/putative voter, such as a digitized signature capturing device 40, e.g., a signature pad. Digitized signature information is captured and processed via signature pads 40 in association with the regional/county level computer 20 and/or another computer 50, such as a portable or laptop computer located remotely from the regional/county computer 20 and the central or state computer 30. An example of a remotely located computer includes one or more computers 50 and associated signature pads 40 located in local libraries, schools, motor vehicle offices, town and municipal offices, banks, and the like.

Communication between and among regional or county level computers 20, central or state computer 30, and/or remote and other computers 50, may be via or include an Ethernet, a local area network (LAN), a wide area network (WAN), the Internet, radio communication, telephone or other wire, cable and/or optical fiber, optical communication, or any other network and/or communication means.

When a person registers to vote using the system described herein, the same questions that are presented on a conventional paper registration form (e.g., name. address (present, previous, mailing, and/or business), citizenship and residence, birth date and place, driver's license number, telephone number, e-mail address, political party affiliation, applicable certifications regarding truthfulness, residency, age and prisoner or parole status, and so forth) are presented to the prospective voter on the display of the computer being used, e.g., as a template. The display format or template utilized may be peculiar to the on-line registration system described, may be made to be similar or identical to that of the conventional paper form, and/or may be made to be similar or identical to that of the Federal Post Card Application for requesting voter registration and/or absentee ballot from a local election office or official, as may be required by law or convenient.

It is noted that the afore-described arrangement is compliant with the applicable local law. For example, where local law requires an original ink signature of the voter, such is obtained by a printer (not shown) associated with one or more of computer 20, 30 and/or 40 that prints a registration form (template) containing all of the information provided by the person seeking to register to vote so that the person can apply his original ink signature thereto and then transmit the original registration form to the appropriate election official via mail or other suitable means. Thus, all legal requirements are satisfied. Even though a paper form is generated to satisfy the legal requirements, the election officials still obtain the benefit of having the required voter information entered by the person registering to vote as well as an identifying biometric characteristic of that person, e.g., a digitized signature. Thus, the labor-saving, cost-saving benefit to the election officials may be realized because they do not have to transcribe and/or enter such information themselves, and/or to scan or otherwise enter the biometric information of the person registering.

If an individual objects to providing a digitized signature for registration, the individual may register by ink signature on the registration form printed as described above, and may later vote by ink signature. Even in this case, the labor and cost saving benefit of the present system and method to the election officials may still be realized, because the information provided by the person registering to vote is already in the voter registration and need not be entered or re-entered by election personnel.

It is noted that any biometric characteristic may be employed in the described arrangement, e.g., biometric data may include any one or more of a digitized signature, a digitized photo, a facial image, one or more fingerprints, one or more palm prints, hand geometry, facial geometry, a face print, an eye print, a retinal scan, and/or an iris scan. In general, however, a digitized signature is a preferred biometric characteristic. In particular, a preferred digitized signature is a digitized signature that includes one or more biometric characteristics of the signer (i.e. a digitized biometric signature), such as a locus-based digitized signature which is described in U.S. patent application Ser. No. 10/127,793 entitled "GENERATION AND VERIFICATION OF A DIGITIZED SIGNATURE" filed Apr. 22, 2002, by Kevin Kwong-Tai Chung et al, which is incorporated herein in its entirety by reference. While the arrangement herein is usually described in terms of a locus-based digitized signature, it is understood that any digitized signature or any other suitable biometric characteristic, may be utilized.

Figure 2:
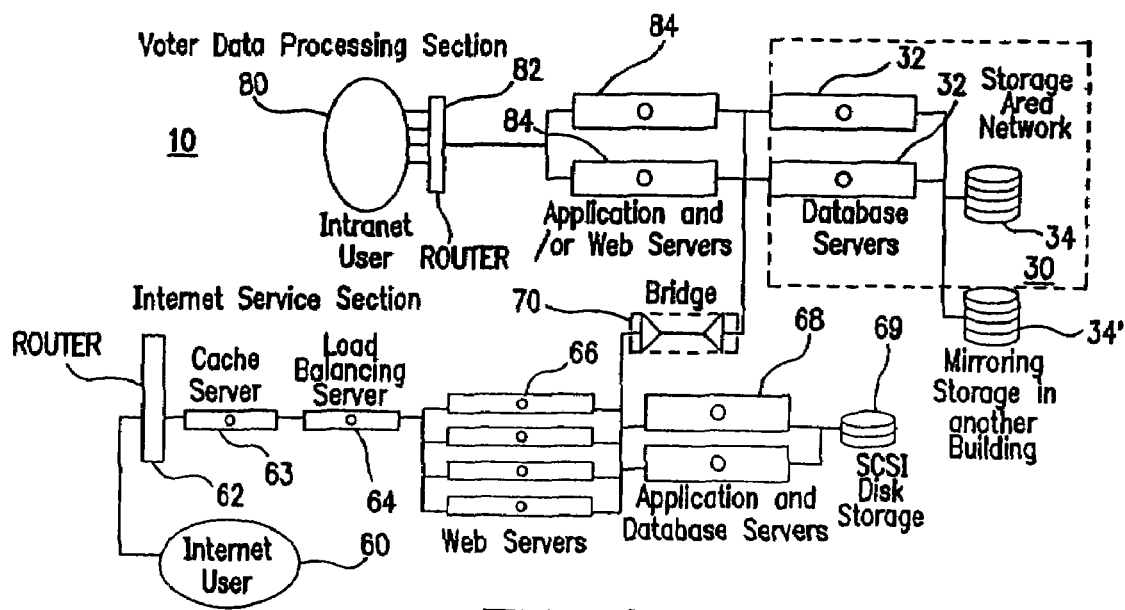
FIG. 2 is a schematic diagram representation of a voter registration system including communication with users via the Internet and/or an Intranet.

FIG. 2 is a schematic diagram representation of a voter registration system 10 including communication with users via the Internet and/or an Intranet. A central computer arrangement 30 includes one or more database servers 32 coupled to one or more storage devices 34. Typically, one of the storage devices 34' is located at a different location than is the main or primary storage device 34, so as to provide data backup and protection against such dangers as fire, earthquake, storm, terror attack, and the like. Typically, an Intranet user's computer 80 communicates with the central computer 30 via a local hub and/or router 82 and one or more application and/or web servers 84. Such Intranet may be or include a local hub, a router, an Ethernet, a local area network (LAN), a wide area network (WAN), or any other network.

Typically, such Intranet user is an official or employee of the election agency that processes voter data, registration data, and changes thereto, and there may be many such users utilizing the system 10 via an Intranet. Alternatively and optionally, some or all of Intranet user computers 80 may have a signature capture device and/or a local printer (not shown) associated therewith and may be in a government office or other location for use by persons to register to vote. In addition, such users may include other government agencies that may have information pertinent to registration and/or voting, such as judicial agencies and corrections agencies that may have or need information pertaining to criminal convictions and/or incarcerations that affect a person's right to vote, health departments and bureaus of vital statistics that may have birth and death information, motor vehicle agencies that may have change of address information, police and investigative agencies that may need information.

An Internet user computer 60 communicates via a router 62, a load balancing server 63, one or more web servers 66 and one or more application and database servers 68. Internet user computers 60 preferably have a signature capture device and/or a local printer (not shown) associated therewith and may be in a home, office, library, school, government office, motor vehicle office, a public building, a bank, and/or a commercial facility or other location for use by persons to register. A separate storage device 69 is provided for accumulating information provided via the Internet by Internet users from computers 60, and such storage device 69 may be regional (e.g., county level) or central (state level). Application and database servers 68 communicate with central computer 30 via bridge 70 and may exchange information between storage devices 34 and 69. Typically, such Internet user may be either a person seeking to register to vote or to change his registration information, and/or an official or employee of the election agency that processes voter data, registration data, and changes thereto, and there may be many such users utilizing the system 10 via the Internet.

Because the system described preferably includes access via the Internet or another network or communication medium, properly authorized users such as election officials, poll workers and the like, may have essentially immediate access to voting registration and voting records at any time authorized. Thus, election officials, both in election offices and at each polling place, may have "real time," i.e. essentially immediate, access to the current voting registration records in a regional and/or central voter database on election day, i.e. during the election. This feature can reduce the need for provisional voting which is burdensome to election officials at the polling places and also causes problems and delays in tabulating the vote and in certifying the election result. Alternatively, all or part of the voting database may be loaded onto individual computers, either via the Internet or other network or via floppy disk, CD-ROM or other medium, for use at a registration site and/or polling place.

In addition, according to the system and method described herein, a prospective voter may register to vote at any convenient time and place, a registered voter may update, change or otherwise correct his voting information at any convenient time and place, and where remote voting is authorized, a voter may vote at any convenient place during the time during which voting is authorized. This offers the possible benefit, were it to be authorized by law, to have elections not confined to particular hours on a particular day and/or to particular polling places, thereby greatly reducing provisional and/or absentee voting, and/or to eliminate the condition where voters in national or regional elections who live in relatively western jurisdictions can learn of election results from relatively eastern jurisdictions where the polls close at an earlier time due to time zone differences.

Figure 3:
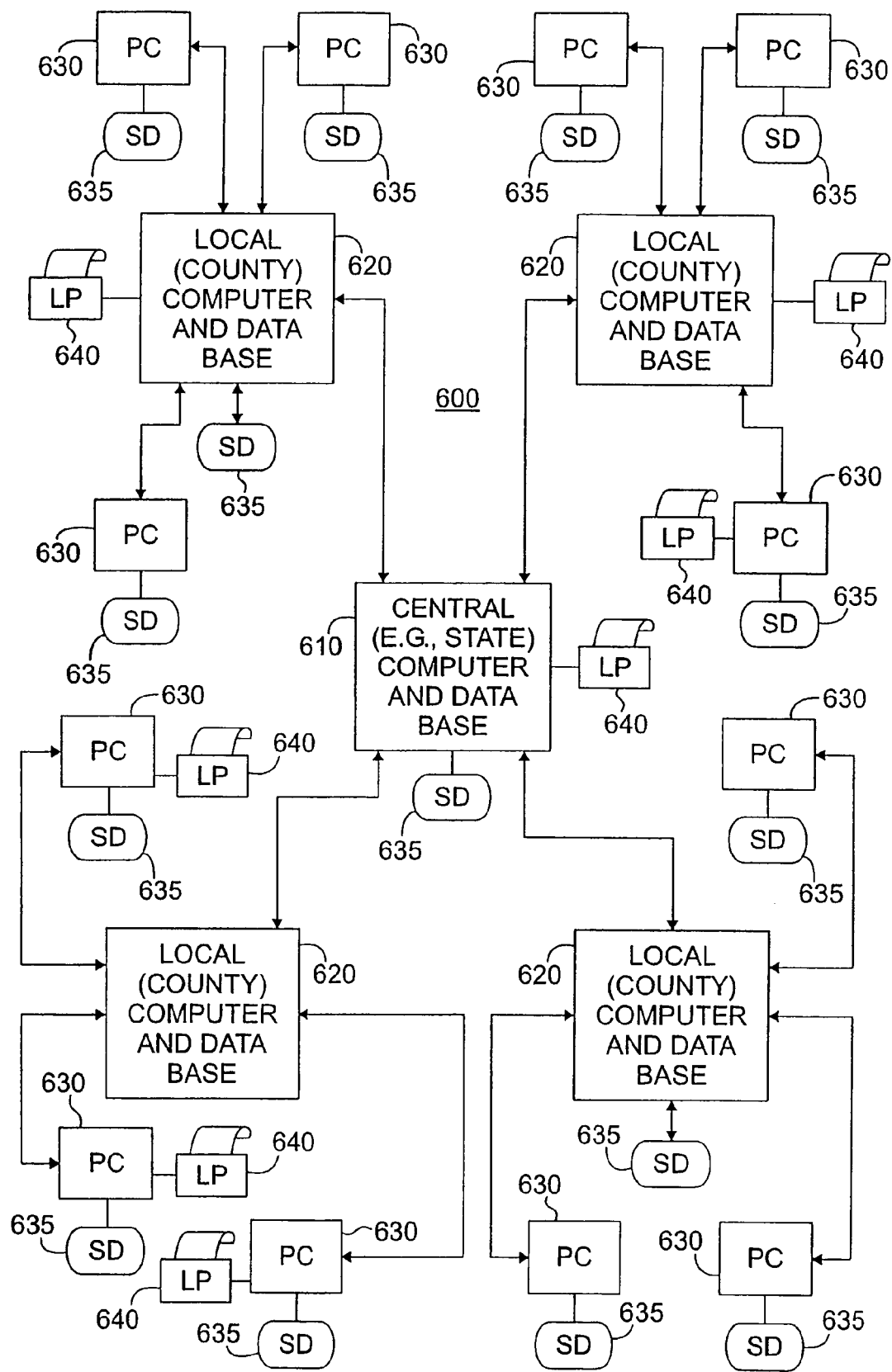
FIG. 3 is a schematic block diagram of an example voting registration apparatus utilizing a digitized signature and for verifying same in relation to a voting transaction.

FIG. 3 is a schematic block diagram of an example voting registration apparatus 600 utilizing a digitized signature and for verifying same in relation to a voting transaction. Example voting registration apparatus 600 is illustrated as including a central computer or server 610 in which resides a database in which digitized signature records including locus-based digitized signature data are stored and preferably are indexed. Central server 610 is in communication (represented by double-ended arrows) with one or more (typically a plurality of) local computers or servers 620, typically located at sites remote from central server 610. Each of the local or distributed computers and servers 620 may optionally include a database in which digitized signature records including locus-based digitized signature data is stored, such as a subset of the records of the database of central server 610.

Each of the local or distributed computers and servers 620 is in turn in communication with one or more (typically a plurality of) computers 630, such as personal computers and/or laptop computers, typically located at sites remote from local server 620 and/or at least apart therefrom at the same site. A signature capture device SD 365, such as a signature pad, a PDA and the like, is typically associated with each of computers 630 for the signing of signatures thereon to produce in cooperation with computer 630 locus-based digitized signature data.

Computer 630 generates a digitized signature data record, e.g., as described in relation to FIG. 3 of U.S. patent application Ser. No. 10/127,793 referred to above, utilizing the locus-based digitized signature data captured by device SD 365 and computer 630, and transmits the digitized signature record to local server 620 which in turn communicates the digitized signature record to central server 610. If the digitized signature record is new, it may be added to the digitized signature database, and if it is a signature relating to a transaction, it may be compared to digitized signature data in such databases for verification and/or authentication. A signature capture device 365 may likewise be associated with a local computer 620 for producing locus-based digitized signature records therewith.

Suitable computers may employ any common operating system, such as the Microsoft Windows operating system, e.g., Windows 2000 with networking, Windows NT, and the like, or a Unix or other operating system, in a conventional client-server arrangement. Servers may utilize a Microsoft SQL server database system software or Oracle database software, with a compatible operating system, e.g., one of the foregoing operating systems.

In the context of voter registration, for example, apparatus 600 may be employed to register voters and/or to request and/or make changes and adjustments to voter records and information at any of the locations where one of computers 610, 620, 630 and an associated signature device SD 365 is located. Additionally and/or alternatively, computers 620 and/or 630 may be voting machines or may run voting machine software so as to permit voting from such locations. In the voting context, locus-based digitized signature capture and authentication may be utilized for verification of the identity of voters and of their being properly registered to vote, as well as for assisting in the detection of persons attempting to vote more than once or in the place of a registered voter, either locally or anywhere in the jurisdictions included in the databases in local (e.g., county) computers 620 and/or in the central (e.g., state) computer 610.

In voting and/or vote registration, a printer LP 640 may be associated with any one ore more of computers 630, 620 and/or 610 for printing a record of information and/or a transaction conducted on such computer. If required by law that registration applications and/or changes to voter information be recorded on a paper document or other tangible record, printer 640 prints such document or record, such as a voter registration form or a provisional or absentee ballot, which can then be signed with an original ink signature to meet the legal requirement, in addition to the electronic record including a locus-based digitized signature. If a particular voter does not want to use a digitized signature for registration or another transaction, then the document or record provided by printer 640 may be signed with an original ink signature without the electronic record being signed with a digitized signature. In either case, the signed paper document or other record may be submitted at the location or by mail, as appropriate.

Communication (represented by double-ended arrows) among various ones of computers 610, 620, 630 may be via any convenient communication link, including but not limited to, wire and cable, telephone system, optical fiber, optical transmission, radio or other RF transmission, network, LAN, WAN, an Intranet, the Internet, and the like. Each registration location and/or polling place thus has essentially direct and immediate access to the digitized signature and other records stored in databases at higher jurisdictions, e.g., voter registration databases at county and state levels.

Where such access is via the Internet and/or world wide web, the only communication facility needed at any location is a conventional telephone line to connect to the modem of computers 620 and/or 630. Thus computers 630 may be computers resident at or laptop computers transported to any desired location, such as libraries, schools, vehicle registration and/or inspection sites, police stations, municipal facilities, government offices, military bases, shopping centers, or any other location where it is desired to register voters and/or conduct voting. Where a computer 630 is already in place at a location, e.g., as is common for a library, and lacks a signature device 365, only a signature device SD 365 need be transported to conduct registration and/or voting at such location. Alternatively, a user could check out or borrow a signature pad from a library and/or government office for registering from any computer having Internet access, e.g., at a home or at a work place.

In certain applications it is relatively easy to quickly retrieve the reference or standard digitized signature from a digitized signature database because the person enters his name or an identifying number under which he has registered, thereby identifying himself relative to his standard signature. In other applications, however, it may be desired to compare digitized signatures without knowing the identity of the signer, as may be the case, for example, for the system and method described in U.S. patent application Ser. No. 10/127, 787 entitled "VOTING FRAUD DETECTION SYSTEM AND METHOD" filed by Kevin Kwong-Tai Chung on Apr. 22, 2002, which is hereby incorporated herein by reference in its entirety. The number of comparisons required before the desired standard digitized signature data is identified and retrieved can be come quite large and require substantial time, particularly where the number of records in the database is large. For example, voter databases could have many millions of digitized signature data records therein.

In such instances, finding the standard or reference digitized signature and/or identifying the person signing a signature is facilitated by indexing of the digitized signature data records. Indexing the digitized signature data records is typically based upon the characteristics of the digitized signature. For indexing numerical values, one convenient indexing arrangement includes dividing a range of values that may form a continuum into a number of bands or quantization levels. Typically, the bands or levels are non-overlapping and divide the continuum in to a manageable and/or convenient number of groups or bands, e.g., a value that may range between zero and ten may be quantized into bands of 0-1, 1-2, 2-3, and so forth, or may simply be rounded to the nearest integer value. Characteristics useful for providing an index or catalog include, for example:

- The number of strokes and dots in the signature (dots are strokes where the starting and ending points are the same or so close together as to essentially be a point, such as in the letters "i" and "j" or in a punctuation "period").
- The relative lengths of the strokes taken in sequence. E.g., the length can be categorized to the nearest integer number of centimeters (for indexing, n cm ±0.5 cm=n cm, where "n" is an integer), and dots are less than 0.1 cm.
- The number of closed loops in each stroke. E.g., closed loops may occur in script letters such as "b", "e", "l" "o" and so forth.
- The relative ratio of the length of the signature to its height. E.g., the ratio X/Y rounded to the nearest integer (1±0.5=1, 2±0.5=2, . . . ).
- The total normalized length of the signature, i.e. the cumulative length of all the stokes of the signature. This may also be categorized to the nearest integer number of centimeters.
- The relative speed of completing the signature, i.e. the total time the signer takes to sign his signature from initial touching of the stylus to the signature pad to the final lifting of the stylus. Time may be categorized, for example, to the nearest whole second or two seconds.
- Other characteristics of the signature, such as the derived values of tangents of one or more specific segments (e.g., a midpoints of closed loops), the instantaneous speed of one or more specific segments (e.g., midpoints of a stroke, instantaneous acceleration at a specific segment, and the like.

For those indexing characteristics relating to size, the dimension preferred for indexing is that after the signature is normalized for size and tilt. It is also desirable that the sizes of the categories or quantization not be too fine so as to allow for reasonable and typical variations and fluctuations in a person's signature, especially for the effects of signing position, comfort, pen weight and size and the like. In general, increasing the number of signature characteristics characterized by the index value will tend to shorten the time required to search a database and retrieve the digitized signatures therein having matching index values. This generally obtains because the number of records in each subset corresponding to a particular index value decreases as the number of characteristics indexed increases, i.e. there are a larger number of subsets each including a smaller number of digitized signature records.

It is noted that plural signatures may be retrieved from the digitized signature data base based upon the index value and those signatures may then be compared to the transaction digitized signature for authentication and, if desired, additional information and/or identification may be requested to eliminate any ambiguity and identify a specific person.

Where each category of each indexed characteristic is represented by an alphanumeric character, then the index value for the digitized signature is simply the string of applicable alphanumeric characters in a predetermined order of the indexed characteristics. Matching the transaction digitized signature to the digitized signature records in the data involves determining the index value for the transaction digitized signature and retrieving the digitized signature records having index values that match the index value of the transaction digitized signature.

It is noted that a further advantage of the described digitized signature record requiring 100-300 bytes, as compared to a conventional digital signature file of 2-3 kilobytes, is that the time required to transmit the digitized signature record is similarly dramatically smaller. Where many digitized signature records are retrieved over a communication link via a typical 56-kilobyte per second modem, the difference in the size of the signature record may make the difference between the time needed to process a transaction being satisfactory and unsatisfactory. At the server, many more queries can be received and responded to in any given time and with a particular server configuration where the record size is typically 300 bytes as compared to 3000 bytes, and up to 30-60 kilobytes for color image or graphic files.

Figure 4:
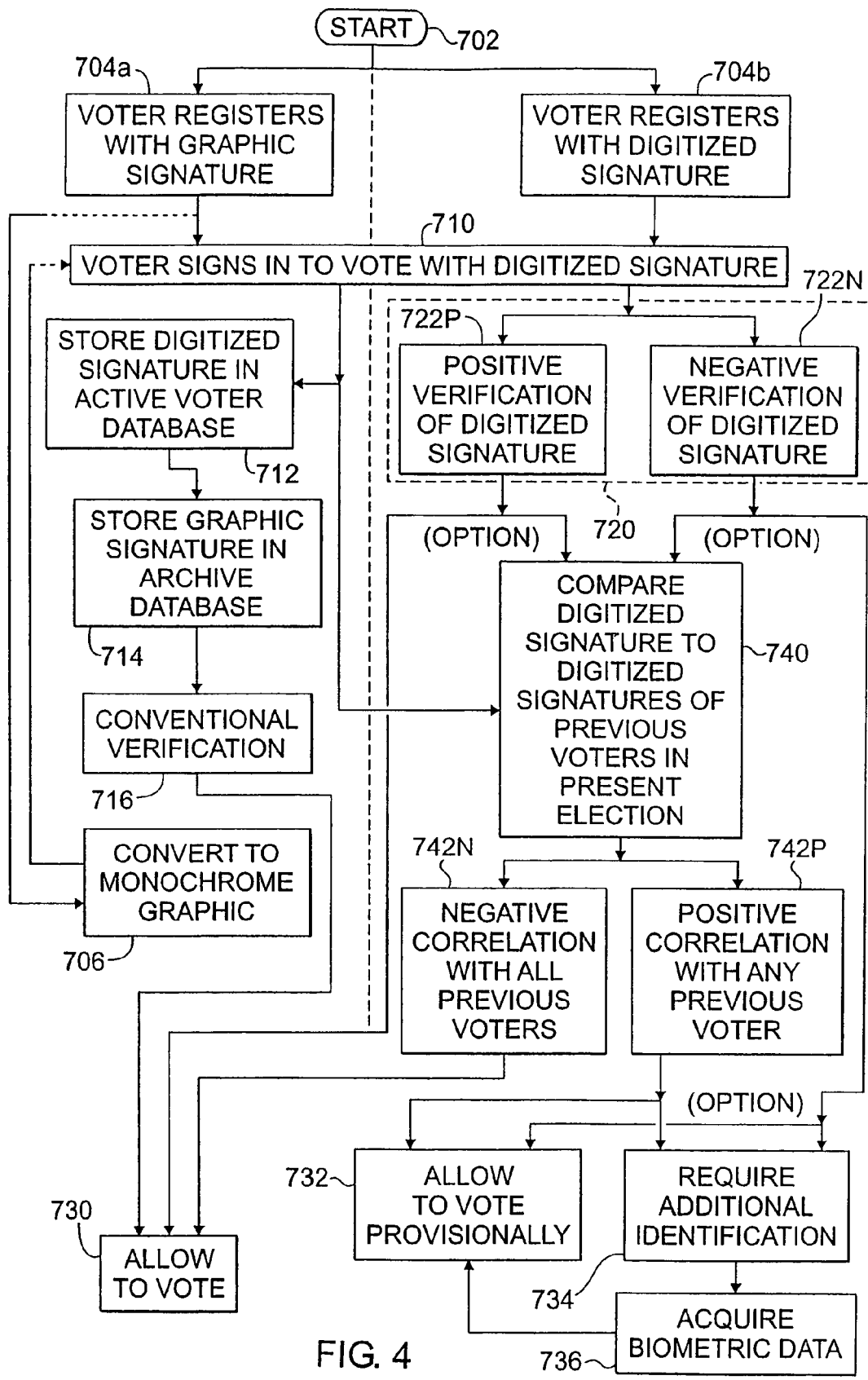
FIG. 4 is a schematic flow diagram illustrating a registration and voting method employing digitized signatures.

FIG. 4 is a schematic flow diagram illustrating a registration and voting method 700 employing digitized signatures. Voting process 700 starts 702 with a voter being previously registered to vote with either a conventional graphic or image-based digitized signature 704a or with a locus-based digitized signature 704b, although another biometric characteristic may be utilized. On the day(s) of the election, a voter signs in to vote 710 at a polling place by providing a signature that is captured as a locus-based digitized signature as described herein. Such locus-based digitized signature is sometimes referred to as a "signature dynamics" signature and/or a D-SIGN™ signature (a trademark of AI Technology, Inc.), and is described in U.S. patent application Ser. No. 10/127, 793 referred to above. Process 700 thereafter may take one of several paths depending upon the previous registration arrangement and the current registration and/or voting arrangement.

Where the previous voting arrangement utilizes graphic or image-based digitized signatures, the locus-based digitized signature is stored and replaces 712 the graphic signature in the database of active voters and the graphic digitized signature is stored or archived 714 to an archive database. Thus, the graphical signature based voter registration database is gradually replaced or converted to a locus-based digitized signature database as each voter votes. Optionally, the voter's identification may be verified 716 by conventional means and the voter is allowed to vote 730. The foregoing builds a voter database of locus-based digitized signature records as each voter votes and so is suitable for conversion from a database of conventional graphic signatures to a database of locus-based digitized signature records. Optionally, where the database of graphic signatures has such signatures stored as color or "gray-scale-rich" graphical images, e.g., in TIFF or .BMP bitmap formats, which require about 20-80 kilobytes of memory each, conversion 706 thereof to a "monochrome" representation which may reduce the size of the record to about 2-8 kilobytes at any time prior to archiving 712 will substantially reduce the storage capacity of the hardware and/or storage media required for storing such records.

Where the previous voting arrangement does not utilize digitized signatures, the locus-based digitized signature is captured and stored 712 in the database of active voters as each voter next votes and the graphic digitized signature is archived 714 to an archive database. Thus, the conventional voter registration database is gradually replaced or converted to a locus-based digitized signature database as each voter votes, or at least a locus-based digitized signature database is developed in parallel.

For preservation of historical records and/or for control of information and election office work, it is sometimes preferred to maintain voter information in plural databases, such as a current or active voter database, an archive database, and an optional pending registration database. Preferably, at least the active voter database and the registration-pending database are "web-enabled" in that they may be accessed and utilized from a computer having a standard web browser, such as Microsoft Internet Explorer, Netscape and the like. Any one or more or all of these databases may additionally be stored in a secure or off-site electronic storage device (e.g., separate servers and/or CD-ROM and/or other device or medium) and/or off-site physical storage location, as dated copies and/or as actively updated mirror files.

The current or active voter database can be utilized to provide monitoring and control of the election process, e.g., for polling books, registration verification, voter cards, voter identifiers, absentee ballots, voter removal, and the like, for use essentially in real-time during an election, such as via a telephone or Internet connection. The archive database may include older or outdated and/or replaced information such as previous signature or biometric data, changes of address or name and the like, suspensions of right to vote, and/or other historical voting data such as of the registration and voting history of individual voters and/or of various voting jurisdictions and/or elections. The optional pending registration database includes registration information provided by prospective voters that has not yet been reviewed and approved by voting officials which, upon approval, is transferred to the active database. In addition, computers and/or servers of other agencies, such as motor vehicle departments, health departments, the judiciary, law enforcement and the like, may communicate with the computers and/or servers with any one or more of the foregoing databases for purposes of facilitating and/or enhancing such functions as registration of voters from the locations of such agencies, and for non-election functions such as updating records for reported deaths, selection of jurors, finding missing persons, tax and law enforcement, and the like.

Where the previous voting arrangement utilizes locus-based digitized signatures, the locus-based digitized signature captured as each voter signs in to vote is utilized for verifying 720 the voter's identity and registration to vote by comparing the then captured locus-based digitized signature and the locus-based digitized signature stored in the database of active voters. Upon positive verification 722P, i.e. the comparison of the transaction digitized signature captured at the polling place is authenticated against the standard digitized signature retrieved from the database of active voters, the voter is allowed to vote 730. In the case of negative verification, i.e. the comparison of the transaction digitized signature captured at the polling place is not authenticated against the standard digitized signature retrieved from the database of active voters, the voter is not allowed to vote 730, but may be allowed to vote provisionally 732 and additional identification may optionally be required 734.

In any of the foregoing cases, it is preferred that the digitized signature captured 710 from the present voter at sign in be compared or correlated 740 to the digitized signatures of all voters who have previously signed in to vote in the same election. If comparison 740 produces a negative correlation 742N with the digitized signatures of all previous voters, then there is no attempt by that voter to vote more than once and he is allowed to vote 730. If comparison 740 produces a positive correlation 742P with the digitized signatures of all previous voters, then there may be an attempt by that voter to vote more than once and he is not allowed to vote 730, but may optionally be allowed to vote provisionally 734. Optionally, where another biometric in addition to a digitized signature is captured upon voter sign in, such secondary biometric data may be acquired 736 from the present voter and stored for later investigation or displayed for immediate comparison with a like biometric captured earlier when the person whose signature positively correlated with that of the present voter signed in, as described in application Ser. No. 10/127,787 referred to above.

In any of the foregoing arrangements it is often desirable to provide features enabling physically impaired people, such as the visually impaired, to utilize the registration and voting apparatus and systems 10, 600, e.g., with voice assistance, as described herein. Conventional computers, including laptop computers and other portable devices, commonly include a sound generating device, such as a speaker and/or a socket for a headphone or earplug speaker, and many include a microphone as well. Whether or not any particular computer includes such devices, they are commonly available and easily installed, and are suited for use by impaired people.

Figure 5:
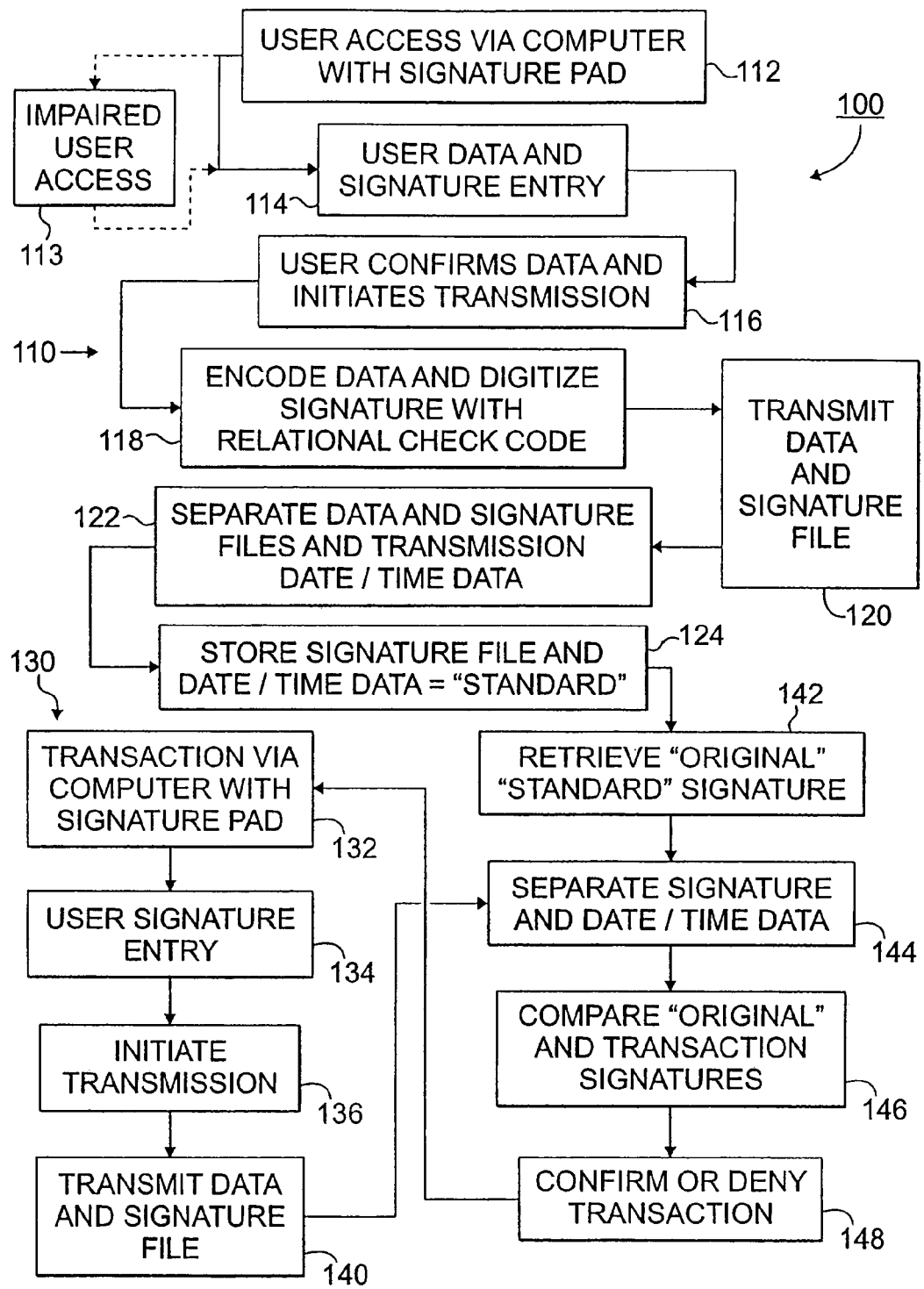
FIG. 5 is a schematic flow diagram illustrating a method for generating a digitized signature and for verifying same in relation to voting registration.

FIG. 5 is a schematic flow diagram illustrating a method 100 for generating a digitized signature and for verifying same, e.g., including access utilizing a remote computer and/or an Internet connection, here described in terms of voting registration. In method 100, a digitized signature is generated 110 or "captured" for a particular user, is then transmitted 120 as digitized signature and other data in a digitized signature record or file and stored 124 as a "standard" or "baseline" or "exemplar" signature for that particular user. Thus far, the process could be characterized as a registration or sign-up of a particular voter. In practice, typically, many voters would be registered over a period of time. Subsequently, the voter may engage in a voting transaction 130 or plural voting transactions wherein a digitized signature for each present voting transaction is verified by comparison to the standard digitized signature previously stored.

Registration 110 comprises a voter accessing 112 via a computer associated with a device having signature capturing capability the particular web site or Internet application. Various devices, both stationary and mobile, may be employed for capturing a signature, including, but not limited to, touch screen devices, resistive and/or inductive and/or pressure sensitive pads, pocket PCs, Palmtop and other hand-held devices, personal data assistant (PDA) devices, "Tablet" PCs, and the like. The stylus and/or pen associated with such device may be a common pen (e.g., an ink-based writing device) or may be a specific device intended for use with the particular signature capture device, and may include an ink-based writing capability. In general, many people prefer an electronic signature pad that provides at the tip of the stylus or pen an instantaneous visual representation (visual feedback) of what has been written (as does an ink pen), rather than one where there is no visual feedback and/or the signature appears on a display remote from the pen tip.

In accessing 112 the application, a digitized signature capturing software application may be downloaded to the prospective voter's computer from the web site via the Internet or an Intranet, e.g., as a "plug in," if not already present on the user's computer. The prospective voter then enters 114 his signature and any other information or data required or desired in relation to voter registration 110. Upon completion of entering 114 data, the prospective voter confirms 116 the data and initiates transmission thereof. In preparing the data and signature for transmission, the signature capturing application encodes 118 the signature and any other data to be transmitted and protects it with a relational check code 118 as described in U.S. patent application Ser. No. 10/127,793 referred to above and in PCT International Publication Number WO 02/31629 A2 entitled "TRACKING SYSTEM AND METHOD EMPLOYING PLURAL SMART TAGS" published Apr. 18, 2002, which is hereby incorporated herein by reference in its entirety. Such information, data and signature may be entered on a "document" presented visually on the display of the prospective voter's computer, and the entire document, as well as the signature and data, may be digitized and protected 118 by the relational check code.

Registration 110 may include applying to register to vote, to vote by absentee ballot, to update or otherwise change voter registration information, or any other form of voting or other government transaction. Where digitized signature is utilized in conjunction with voting registration associated with a smart card, the digitized signature and/or other voting information may be stored in the memory of the smart card for comparison/verification at a point of use, such as a voting machine, a polling place, a precinct, a registration or election official office, and the like.

Transmission 120 of the digitized signature and data as a digitized signature record is typically via the Internet or over an Intranet or other communication link and/or network, typically with a suitable level of encryption, such as a conventional 128-bit or greater encryption algorithm, e.g., the known MD5 128-bit encryption. Encryption may include plural levels of encryption. For example, MD5 128-bit encryption may be utilized to encrypt the digitized signature, then MD5 128-bit encryption may be utilized to encrypt the voter registration data and the previously encrypted digitized signature, and then an Internet/e-commerce 128-bit encryption may be utilized to encrypt the MD5-encrypted voter registration data and digitized signature for transmission via the Internet.

Date/time data (e.g., to millisecond of time) obtained from the Internet or other server is preferably associated with the digitized signature record and may also be represented in the relational check code. The digitized signature data is separated 122 from the date/time data and each is stored 124 as a "standard" for the particular registered voter. While certain conventional signature verification systems require that plural samples of a person's signature be captured in order to generate sufficient samples to statistically characterize the signature to account for variations present in any single signature, it is not necessary with the D-SIGN™ system to capture plural samples although plural digitized signature samples may be used.

In a voting transaction 130, voting transaction 130 is initiated 132 using a voting machine or computer having an associated signature pad, similarly to that for voting registration 110 above. After entering data 132 to identify the voter and define the desired voting transaction, part of which data is provided by the voter and part of which data may be provided by the voting machine and/or computer being utilized for voting, the voter enters 134 his signature via the signature pad and initiates transmission 136 of the digitized signature and voting transaction data to the regional (e.g., county level) and/or central (e.g., state level) computer including the voter registration database, e.g., as described above. The digitized signature and voting transaction data is generated and transmitted 140 as a data and signature file, similarly to a digitized signature record, with a relational check code. Upon receipt by the regional and/or central computer, the digitized signature and date/time data are separated 144 from the other voting transaction data. In addition, the "standard" digitized signature for the voter identified in the transmitted voting transaction data is retrieved 142 and the digitized signature data for the particular voting transaction is compared 146 directly therewith.

If the voting transaction digitized signature and the standard digitized signature for the voter match (to within specified criteria, as described in U.S. patent application Ser. No. 10/127,793), then the voting transaction is confirmed 148 back to the voter, i.e. voting is authorized. If the voting transaction digitized signature and the standard digitized signature for the voter do not match, then the voting transaction is denied 148 and the voter is so advised. If permitted by the voting transaction protocol established by the election law and regulations, or appropriate government agency, the voter may be permitted to make more than one attempt at entering a signature for establishing a match or his identity may then be confirmed by other means, e.g., personal appearance, photo identification, and the like.

It is noted that voter access in method 100, as well as apparatus and systems 10 and 600, may include features permitting access 113 by people with certain impairments and/or limitations, such as visual impairment, hearing impairment, and the like. For example, impaired voter access 113 may include voice or other audible instructions and/or voice/speech recognition and/or an enlarged visual display, e.g., line by line enlargement, to assist a sighted voter or enable a visually impaired voter. Physical features such as a distinct area for signing, raised and/or textured keys on a standard or Braille keyboard, Braille instructions, a Braille readout device, and the like, may also be utilized. Another helpful feature is audible confirmation of data entered, e.g., read back thereof, and of the method steps, for enabling easier and timely correction of errors. Any special instructions or requirements for sighted voters, e.g., that appear on a screen or other display, may also be assigned to particular keys on a keyboard or given voice commands for other voters. Commercial devices and/or software for providing certain features for access by the impaired are available from various sources.

While the necessary software applications and drivers for providing such impaired voter access is easily provided in the client-server environment, such as by pre-installation, such is not necessarily the case where voting registration and/or voting is conducted via the Internet. In such cases, the necessary voice assistance and voice files may be downloaded with the voter registration file download, e.g., as described in relation to FIG. 6. It is noted that standard voice and/or sound synthesis software that is standard to computer operating systems, such as the voice synthesizer included in the Microsoft Windows 2000 and later operating systems, may also be utilized for assisting utilization by impaired persons, and may be advantageous where the voice files that would otherwise need to be downloaded are relatively large and might require long download times.

Desirable features for conducting voting registration and/or voting transactions as described include one or more of the following:

1. The signature or other biometric data and application program should not accept graphical signature representations or the like that can be copied, e.g., by cut and paste, from another source.
2. Signature or other biometric data should be captured substantially in "real time" with a reliable date/time stamp made part of the signature or other biometric data record along with the digitized signature or other biometric.
3. Devices suitable as signature pads for capturing a signature should be able to detect the locus and speed of the signature needed for digitization.
4. The signature or other biometric digitizing arrangement should be in modular form that can be attached to or associated with web-based and/or web-enabled applications, e.g., as a software program, that can be downloaded seamlessly (e.g., without significant separate action being required on the part of the voter) when the voter accesses the application, e.g., via the Internet.
5. The digitized signature and other data or document(s) associated with a voting registration and/or voting transaction should be protected by a relational check code generated from the data values of such digitized signature, and preferably also the data and/or document(s). Preferably, the relational check code is generated immediately when the voter initiates transmission of data, and the digitized signature data record and the data and/or document file may be "wrapped" into a single file.
6. The digitized signature or other biometric and/or other data should be encrypted when transmitted over the Internet, e.g., utilizing 128-bit or greater encryption coding.

It is noted that any one or more of the foregoing advantages need not be present or produced in an embodiment including and/or utilizing the invention.

Figure 6:
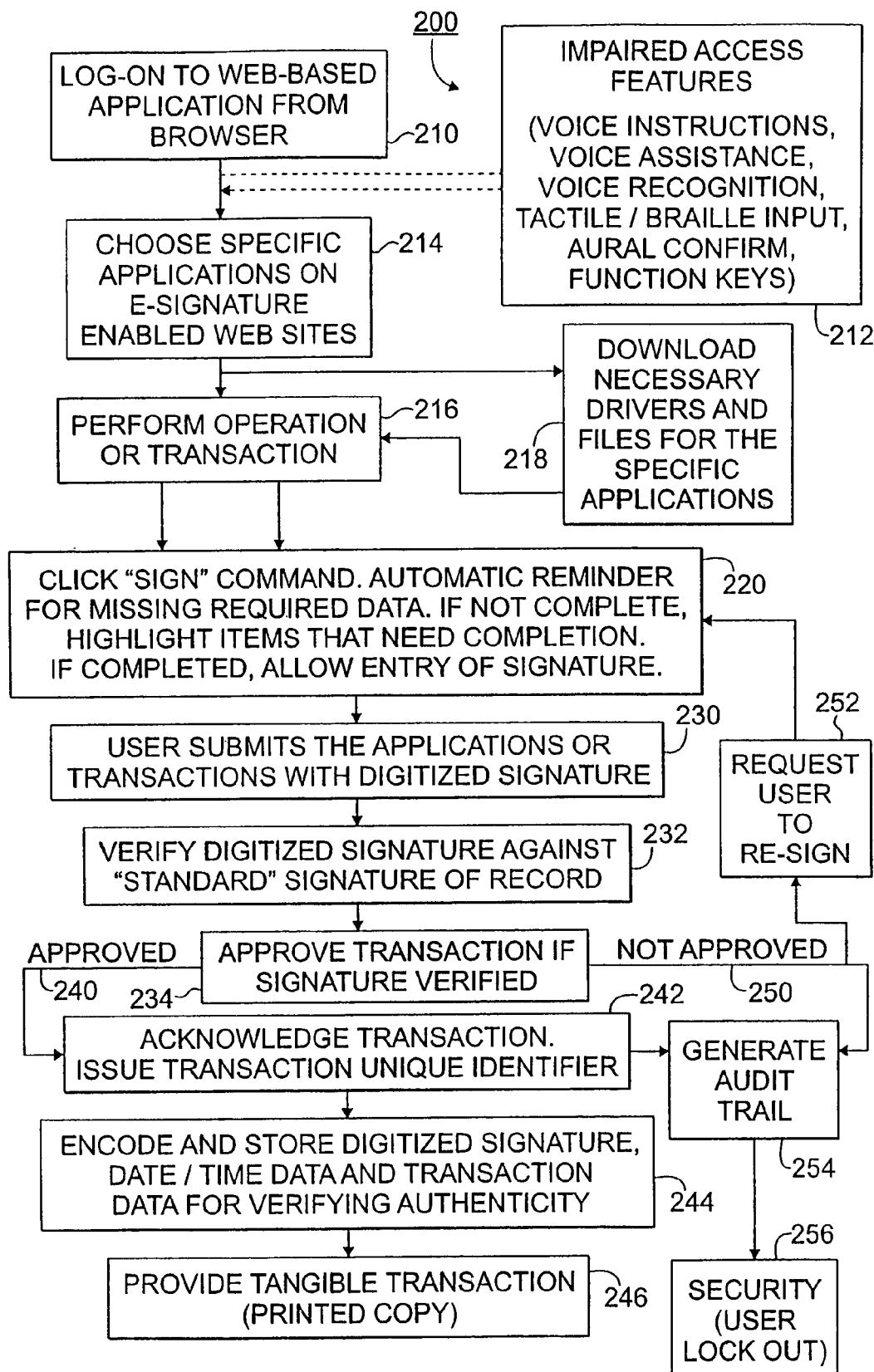
FIG. 6 is a schematic flow diagram illustrating a method for registering using a digitized signature and for verifying same in relation to a voting transaction.

FIG. 6 is a schematic flow diagram illustrating a method 200 for registering using a digitized signature and for verifying same in relation to a voting transaction, e.g., an in-person or an Internet or other remote voting transaction. In method 200, a user logs on 210 to a web-based voting application from his Internet browser and chooses 214 the specific voting applications of interest on an electronic signature enabled web site, i.e. an application and web site that provide for generation and/or verification of voting registrations, particularly utilizing digitized signatures, as described herein. It is noted that impaired access features 212 such as sequential display of enlarged instructions, e.g., line by line enlargement, voice instruction, voice assistance, voice recognition, tactile and/or Braille input and outputs, aural confirmation of data and/or transaction, and/or appropriate function keys adapted for access by the impaired, may be provided.

If the necessary drivers, signature digitization and coding, files, and/or other software is not present on the voter's computer, such may be downloaded 218 as needed from or with the particular digitized-signature enabled voting application. Download 218 may be automatic in that it is initiated by the application without voter intervention or request, or it may require some voter action, e.g., click on a "download" or "accept" button. The voter may then perform 216 the voting operation or voting transaction as appropriate, e.g., completing registration forms or templates, making changes and/or corrections, initiating voting, and so forth.

Where impaired access 212 is provided, down-loadable software applications and drivers include, for example, voice-assistance programs and voice files that are downloaded either temporarily or as installed, permanent or embedded programs. Preferably, the voice programs and voice files are compressed files so as to reduce transfer time over common, slower communication devices (e.g., 56 kilobyte/second modems). Alternatively, a synthesizer embedded in an operating system or other application may be utilized, and the selection of the synthesizer to be utilized (e.g., that of the operating system or an application program or of a specially downloaded synthesizer program) may be determined automatically by the voting registration system and/or voting application software.

When the voter has completed entering data and otherwise entered what is required for the desired voting transaction, he clicks 220 on the "sign" button or command to begin generation of the digitized signature. If the voter has not completed the prerequisites to signing, he is reminded to provide missing data or perform omitted steps. The reminder typically is automatic in that no voter action is necessary, and may take the form of highlighting or otherwise visually distinguishing the data to be provided or the step(s) to be taken. If and when the voter completes the necessary data and steps, the signature capture device, e.g., signature pad, is enabled for the voter to enter his signature by signing 220 thereon. The voter then may submit 230 the voting registration application or voting transaction with the digitized signature embedded in a digitized signature record associated therewith, i.e. the voter submits a voting transaction request to government or other election agency, i.e. the proprietor of the web site subject to verification and acceptance thereof. As above, transmission of data is preferably encrypted with 128-bit or greater encryption.

The web-based voting application on the server of the web site proprietor (e.g., the server of a election or government or private entity, and the like), verifies 232 the digitized signature. Verifying 232 includes retrieving an original or standard digitized signature associated with the voter, i.e. the voter as identified in the voting transaction request, from its database and comparing that standard digitized signature to the digitized signature submitted as part of the proposed voting transaction request. Approval 234 of the voting transaction depends upon verification 232 of the digitized signatures. Verification 232 of the digitized signatures may also include comparing the digitized signature for each transaction against all other digitized signatures in the voter database, e.g., for assisting in detecting attempts to register and/or vote in plural districts or jurisdictions, and/or comparing any other registration information in the database, such as names, addresses, social security numbers, drivers license numbers and the like. Plural registration and/or voting may arise from attempts to vote illegally, or may arise innocently as where a person moves from one district to another and there seeks to register without having canceled his previous registration.

It is noted that the voting transaction involved may be an initial registration by a voter, in which case no previously captured "standard" digitized signature is in the voter registration database for that person, in which case verification 232 for duplicate registrations based on voter information without digitized signature may be utilized. In any case, because the voter registration database preferably is a state-level or even a national-level database, the likelihood of detecting plural registrations is greater. In addition, where verification 232 includes comparing a voter's first name and identifying number (e.g., all or part of a social security number and/or a driver's license number), changes in name and/or marital status may also be detected.

If the digitized signatures match to the established degree of likeness, the voting transaction is approved 240 and is acknowledged 242 by transmitting to the voter a message so indicating as well as an identifier unique to the voting transaction, sometimes called a voting session identifier, confirmation code or confirmation number or transaction number. The number or code may include a system, serial or sequence number, date/time data, and/or other data either related or unrelated to the voting transaction, as desired and/or required by voting law and/or regulation.

Closely associated with the approval/acknowledgment steps is the encoding and storing 244 of the digitized signature, date and time data (e.g., to the millisecond) from the Internet server or web site server, and voting transaction data, for creating a file record that may be used for verifying the authenticity of the voting transaction. Preferably such file record "binds" the voting data into a single record that is encrypted and/or protected by a relational check code as described above. At least the digitized signature for the voting transaction and the Internet transmission date/time data are related and protected by a relational check code to provide a unique signature record (or stamp) for later use for authentication, if needed. Optionally, all or any desired part of the transaction data may be combined and encrypted and/or protected.

For certain voting applications it may also be desired or necessary to have a written record of the transaction, as is the case where the transaction involves voter registration, absentee voting, provisional voting, and/or where the applicable law requires a written (ink) signature. In such instances a tangible voting transaction record is provided 246, such as by a printer either at the voter's computer or at the web site proprietor, for ink signature by the voter, and possibly with verification of identity by conventional means such as birth certificate, driver's license, passport, photo identification, and the like.

If the signatures do not match to the established degree of likeness, the voting transaction is not approved 250 and such result is acknowledged by transmitting to the voter a message so indicating. Typically, the voter is requested to sign again 252 so that another attempt can be made to complete the proposed voting transaction (it is usually desirable that the voting transaction be completed). After a predetermined number of attempts wherein a matching of digitized signatures is not successful, the voter may be "locked out" 256 or otherwise prevented from attempting the proposed and/or other voting transactions, either for a predetermined period of time or permanently, as determined by the election law and/or regulations.

Whether the voting transaction is approved 240 or is not approved 250, an audit trail is generated 254 so that each voting transaction, proposed or completed, can later be investigated, verified or otherwise reviewed. Typically, generating 256 an audit trail keeps track of failed attempts to complete a voting transaction and locks out 256 the voter under prescribed conditions. It is noted that audit trail tracking of voting registration and voting activity may facilitate various election monitoring and control functions, e.g., the application for, issuance of, recording and monitoring of absentee ballots and voting thereby, as well as voting under the Uniformed and Overseas Citizens Voting Act, while reducing the likelihood of undetected duplicate voting. When using the D-SIGN™ digitized signature verification feature and signature comparison feature as described in U.S. patent application Ser. No. 10/127,787 referred to above, voter impersonation, forgery, plural voting, and other attempts at voting fraud, are highly likely to be automatically detected.

For Internet or web-based applications, it is desirable that the signature pads, PDAs and other devices utilized for capturing a signature be transportable and/or mobile, unlike client-server-based applications where a signature device is associated with each client computer or where the appropriate software drives is installed on each client computer so that a signature device may be utilized therewith. But each computer logging on to a voting web site cannot be expected to have the necessary software drivers installed. Thus, the signature device should be compatible with the computer and operating system commonly utilized in accessing the Internet, as may be provided for operating with software systems such as Dot-NET available from Microsoft Corporation of Redmond, Wash., or by an "Active X Contror" created in the Visual C$^{++}$ language for embedding in the web-based application and/or system.

Preferably, the driver for the applicable signature digitizing device and/or any needed signature digitizing software are made to be downloaded seamlessly (e.g., without requiring the voter to initiate an action or to be aware that an action is being taken automatically) to the voter's computer when the voter accesses the web site voting application utilizing digitized signature generation, capturing, and/or authentication. The driver and/or signature digitizing software preferably does not leave the digitized signature or any signature data on the web browser or hard drive of the voter or client computer when a use of the voting application is finished, so as to improve security and prevent the copying of a digitized signature, although the device driver may remain.

As noted above, when a person registers to vote using the system and method described herein, the same questions that are presented on a conventional paper registration form are presented to the prospective voter on the display of the computer being used, e.g., as a template. For example, the display format utilized may a similar or identical form to that of the conventional paper form, either as a complete "page" or as a sequence of screens presenting questions to elicit the necessary information. For access by the visually impaired, the necessary information must be elicited sequentially by aural (voiced) questions in response to which information is provided either via a keyboard or other physical data entry device or by spoken response. Typically, the same segmentation and logical sequence as is utilized for eliciting information from non-impaired persons may be utilized for impaired persons. The voice file containing the segmented sequence may be downloaded as a single file, e.g., at the commencement of a registration session or a voting session, or may be downloaded as a sequence of files during a registration session or a voting session, either as modem capacity is available or on demand. Similarly, the synthesizer and/or voice recognition files, if downloaded, may be downloaded at the commencement of or during a registration session or a voting session.

For impaired voter registration and/or voting, a synthesized or recorded voice presents instructions and question segments to the impaired person via a speaker or headphone, and the impaired person responds by entering the called for response and/or information. After the person completes his response to each instruction and/or question, e.g., as indicated by a particular keystroke or other response, the information he provided is read back by the voice synthesizer so that the person may confirm its correctness and may, if desired, make changes and/or corrections. When each segment is completed, the next segment commences until all segments have been completed, and so the person will have successfully registered and/or voted.

In a basic form for impaired registration and/or voting, the impaired person responds by entering the called for response and/or information via a keyboard. The keyboard may be either a standard keyboard or may be enhanced with Braille features, raised keys, keys having tactile features and the like. One form of special keyboard has the keys located at the four corners (or other positions) raised to a higher level than are the other keys so as to ease their recognition by touch. These raised keys may be utilized for providing specific responses to prompts and/or instructions, e.g., acceptance, confirmation of correctness, or for indicating a desire to repeat and/or change or correct an earlier response. After the person completes his response to each instruction and/or question, the information he provided is read back as a sequence of letters and/or numerals by a basic voice synthesizer, i.e. the entered response is repeated back to the impaired person character by character. Alternatively, the voice synthesizer may recognize and reproduce the information entered by keystrokes as words and/or numbers.

Also alternatively, voice recognition is provided so that the impaired person may respond by spoken responses, rather than by keystrokes or other manual input. The person speaks into a microphone coupled to the computer. This is not only more convenient, but accommodates people who may not be familiar with a keyboard or Braille, and typically can be faster. The spoken responses may be in words and/or phrases, or the person may spell his response character by character. Typically, voice recognition software tends to be more accurate in recognizing individual characters spoken by different voices than with words and phrases spoken by different voices. Suitable voice recognition software is available from several commercial providers, e.g., from Microsoft Corporation of Redmond, Wash., from Dragon Systems of Newton, Mass., and from ScanSoft, Inc., of Peabody, Mass. The voice synthesizer may recognize and reproduce the information responses either as characters (i.e. as letters and numerals) or as words and/or numbers.

In addition, the signature pad or other signature capture device may have physical features, such as raised or depressed regions, that define and/or indicate to a visually impaired person where on the signing surface of the signature device to sign his signature. Additionally and/or alternatively, the signature pad may be coupled with the synthesizer for providing voice prompts to instruct and/or guide the impaired person to position the pen or stylus on the signature signing area and in a typical starting point region of the signature device. Where the impaired person is unable to sign a signature on a signature device, the voice recognition software may be utilized to obtain a "voice print" of the person's spoken name, and possibly other information, that can be accepted as identifying biometric information in place of a digitized signature.

When the impaired person completes the registration and/or voting session, the information pertaining thereto is submitted to the regional and/or central computer for processing in the manner described herein. The person may be prompted to take a printed receipt or copy of his registration form, and/or to sign same, in the same manner as for a non-impaired person. File and information transfer via a network, the Internet or other communication medium, with encryption, is preferably as described herein, and/or as described in U.S. patent application Ser. No. 10/127,793 and in PCT International Publication Number WO 02/31629 A2 referred to above.

Figure 7:
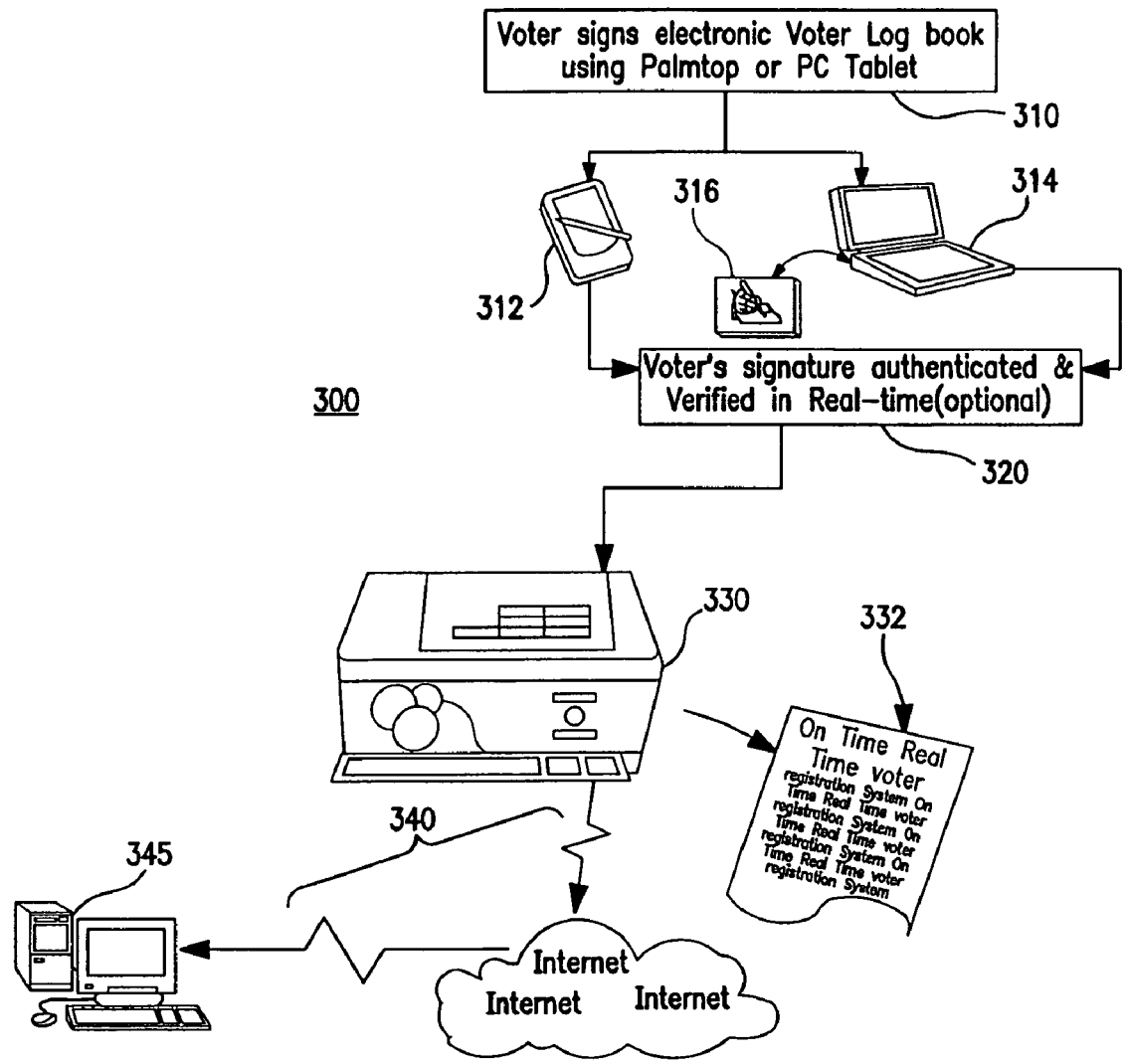
FIG. 7 is a representation of an example voting arrangement useful with the voting registration apparatus of FIGS. 1-3.

FIG. 7 is a representation of a voting arrangement 300 useful with the voting registration apparatus of FIGS. 1-3 for conducting a voting transaction comprising an election. A voter signs in 310 to vote by signing his signature in an electronic voting log book, such as by signing his signature on a touch sensitive screen of a personal digital assistant device 312 or of a signature pad 316 coupled to a computer 314, for example, a laptop or other portable computer, thereby to provide a digitized signature for the present election (voting transaction). Optionally, but preferably, the voter's digitized signature is authenticated and verified 320 by comparison to a standard digitized signature contained in a voter registration database that was obtained from the voter at registration to vote, at changing or updating his registration to vote, or at a previous election. Optionally, the voter's digitized signature is also compared with the digitized signatures of all persons who have already voted in the present election to detect an attempt to vote more than once.

If the voter's digitized signature is authenticated and verified, then the voter is approved to vote; if not, the voter is denied to vote and/or may vote provisionally. The approved voter is preferably issued a unique, random and anonymous voter identification number (VID#), also referred to as a voting session identifier, for use in voting in the present election where a direct recording electronic (DRE) voting apparatus 330 is utilized. Typically, a new VID# is issued to each voter for each election. The system and method for registering and/or approving voters described may be operated in conjunction with electronic voting equipment 330, and is desirably operated in conjunction with the voting apparatus and method described in U.S. patent application Ser. No. 09/737, 306 entitled "ELECTRONIC VOTING APPARATUS, SYSTEM AND METHOD" filed Dec. 15, 2000 by Kevin Kwong-Tai Chung and in published PCT International Publication No. WO 02/070998 (PCT/US01/45769) entitled "ELECTRONIC VOTING APPARATUS, SYSTEM AND METHOD" filed Nov. 1, 2001 by Kevin Kwong-Tai Chung.

To conduct a voting session, i.e. to vote, the voter enters his voting session identifier (VID#) typically via a touch screen of apparatus 330. Voting apparatus 330 presents voting screens comprising the ballot of positions and questions before the voters and the voter makes his desired voting selections. At the conclusion of the voter's voting session, apparatus 330 stores the voting selections made and the voting session identifier as a voting record, i.e. it records the ballot "image," and preferably generates a printed receipt 332 of the voting session that contains the voting record. Preferably, the printed receipt 332 is retained by apparatus 330 after the voter has opportunity to review it and confirm that receipt 332 accurately records his voting selections.

It is noted that the VID# may include, in addition to the unique, random and anonymous identifier, characters identifying the voter's political and voting jurisdiction (e.g., state, county, municipality, district, precinct, polling place) based on residence, and may also include party affiliation, and the like. In such case, the identifying characters may be utilized for generating a voting ballot for the voter, for example, as described published PCT International Publication No. WO 02/070998 (PCT/US01/45769) referred to above. It is further noted that such identifying characters may also be utilized (either alone or in conjunction with information in the voter registration database) for associating voters with a voting district upon initial registration and for automated redistricting where voters are assigned to particular voting districts and/or polling places, e.g., on the basis of residence. In such case, district and redistricting information is typically stored in separate administrative and/or redistricting databases (e.g., for providing an audit trail) and may be further utilized for generating voting jurisdiction information (either new or updated) for inclusion in each voter's VID#. Automated district assignment and redistricting may utilize an address-based district map, postal codes such as ZIP codes, geographic information system (GIS) mapping, and the like.

At the conclusion of the election, voting apparatus 330 tallies or tabulates the votes cast in all of the voting sessions conducted thereon during the election, i.e. it tallies or accumulates the votes from all of the individual voting records. The tabulated vote is then communicated by apparatus 330 via the Internet and/or other communication link 340 to the respective server(s) 345 of local and/or county and/or state election offices or centers. Computers/servers 345 tabulate and/or accumulate the tallied voting records communicated from all of the voting apparatus 330 utilized to provide an election result, which tabulation and/or accumulation is then printed in one or more reports of the results of the election.

It is noted that registration of voters may be conducted at the polling place and during an election, sometimes referred to as "same-day registration," using the arrangement of FIG. 7. In such case, devices 312 and/or 314 and the signature or other biometric characteristic capture devices associated therewith also function as described, e.g., for registration computers PC 630 of FIG. 3, and in accordance with the method of FIGS. 4 and/or 5 and/or 6. Preferably, devices 312 and/or 314 are in communication with a central computer for at least preliminary verifying eligibility to vote and/or issuing a VID#, and have a printer associated therewith for printing a voting registration form for ink signature, if required. Typically, a voter registering and voting on the same day is permitted to vote provisionally so that eligibility to vote may be confirmed or verified before his vote is counted.

It is also noted that sign-in apparatus 312, 314, 316 and voting apparatus 330 need not be located in the voting jurisdiction conducting the election, but may be at any location from which communication may be established with servers/computers 345. Thus, sign-in apparatus 312. 314, 316 and voting apparatus 330 may be in another city, another county or another country, such as in an embassy, consulate, military base or field location any where in the world. It is further noted that fail-safe back-up against equipment and/or communication medium failure may be provided by storing all necessary files and database information on a portable medium, such as a CD-ROM, with a copy available at each polling place and/or election site.

FIGS. 8A through 8D illustrate examples of screen displays useful with the apparatus and method described. Traditionally, a voter "signs in" to vote on election day and an election official or poll worker comparing that signature to a signature previously collected from the voter, such as when the voter registered to vote. The signature may be on a registration record or voter card, or may be on a printed or electronic reproduction thereof. Such signature comparison is usually required by the applicable election law. Most election officials and poll workers, however, are not trained or expert in handwriting analysis or signature comparison, and so the ability to detect forgeries or to verify signatures that have changed over time due to aging and/or illness is not high. Automated comparison of digitized signatures augments the role of the election official and poll worker, and may also provide a screen display for visual comparison by the election official and poll worker.

Figure 8A:
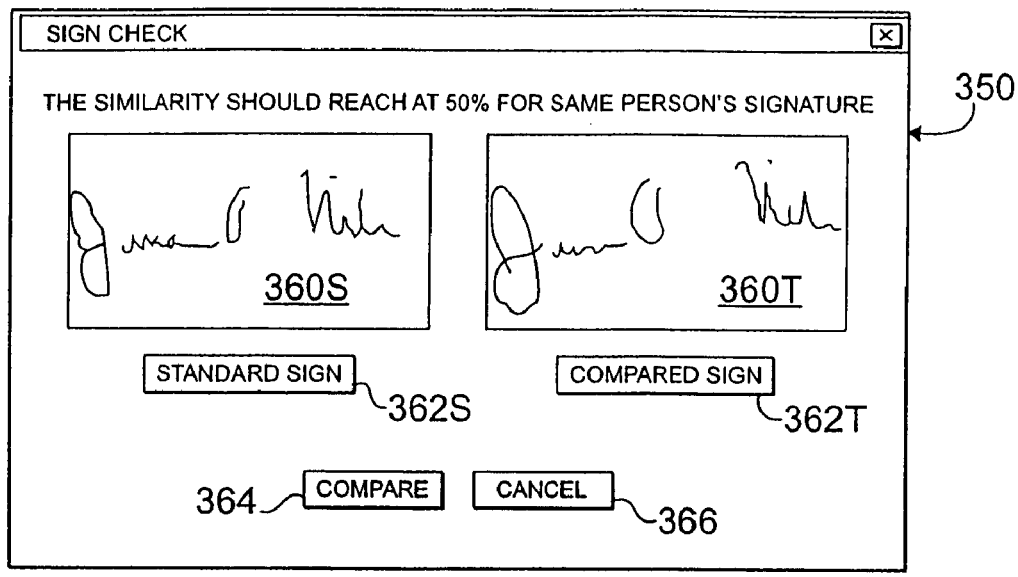
FIGS. 8A through 8D illustrate examples of screen displays useful with the apparatus and method described.

FIG. 8A illustrates a screen display 350 including two windows 360S and 360T wherein are displayed a standard or reference signature and a transaction signature, respectively, such as would be displayed after a person has accessed a locus-based digitized signature application, such as in registering to vote, and has signed his signature in connection with a voting transaction, e.g., signing in to vote on election day. The signature displayed in window 360S represents an image representation derived from a locus-based digitized signature previously captured, such as in registering to vote, and window 360T represents an image representation derived from a locus-based digitized signature presently captured on election day and which is to be authenticated by comparison to the standard locus-based digitized signature. Windows 360S, 360T are identified by labels 362S, 362T, respectively. Clicking "Compare" button 364 initiates the comparison of the standard (registration) and voting transaction (election day) signatures and enables the signature pad or other device for the next transaction, e.g., alternatively clicking a "Submit" button or a "Process Transaction" button in submitting the voting transaction for processing. Clicking "Cancel" button 366 deletes the transaction signature and enables the signature pad or other signature device for the signer to again sign his signature. Optionally, if neither the "Compare" or the "Cancel" button is activated within a predetermined time, then the process may "time out" to clear or reset the signature device and processor in preparation for another transaction, or may display a prompt for the person to take the next action, and allow time for him to do so, before timing out.

Figure 8B:
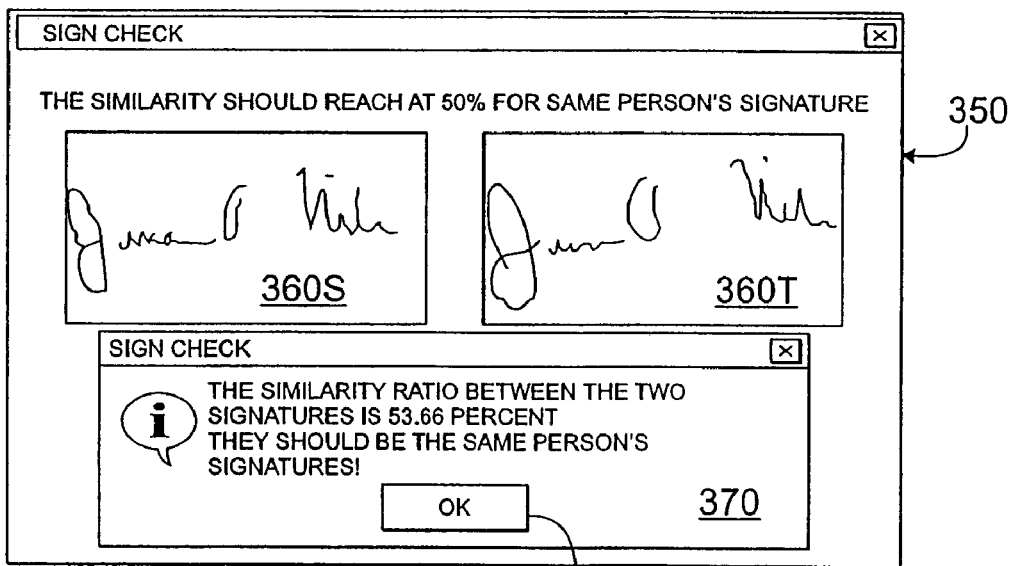

FIG. 8B illustrates screen display 350 after "Compare" button 364 has been activated to initiate comparison of the standard locus-based digitized signature, e.g., collected at registration, and the voting transaction locus-based digitized signature in the case where the authentication process has determined that the two signatures are a match, i.e. are authentic. An overlay window 370 is displayed to indicate that the result of authentication is a positive match and that the voting transaction signature is likely signed by the same person who signed the standard or registration signature, and so may be permitted to vote. Optionally, the result of the authentication process may be displayed, e.g., as a percentage representative of the probability $P_s$ determined in the authentication process. An "OK" 372 is provided to remove window 370 and take the user, such as an election official, to the next screen. It is noted that the standard and transaction signatures 360S, 360T may be displayed side-by-side as a static display or may be displayed side-by-side as signed, i.e. as a "movie" of the signature being signed.

Figure 8C:
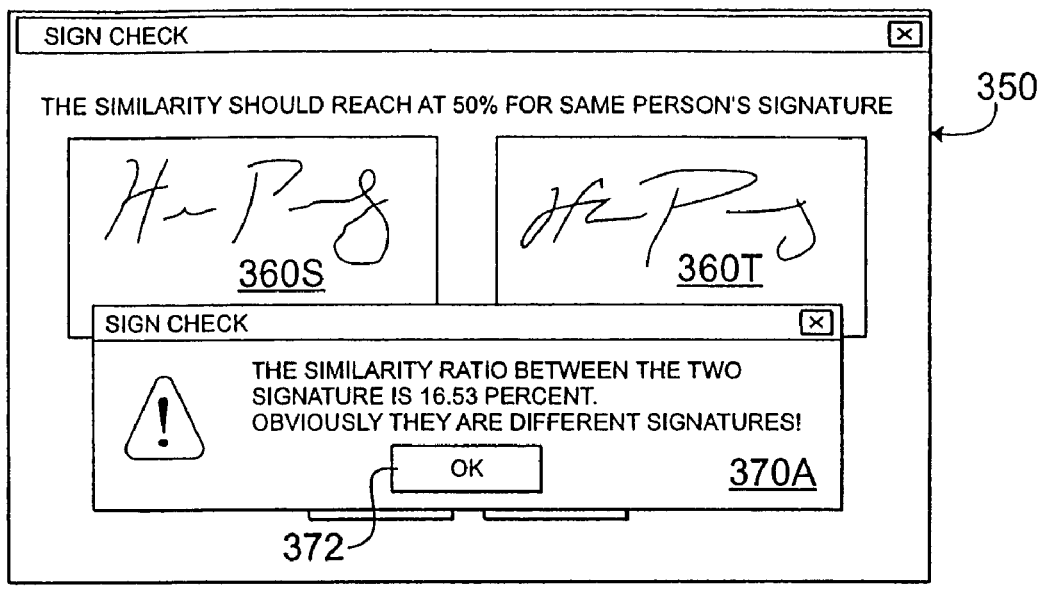

FIGURE 8C illustrates screen display 350 after "Compare" button 364 has been activated to initiate comparison of the standard locus-based digitized signature, e.g., collected at registration, and the voting transaction locus-based digitized signature collected from the voter in the case where the authentication process has determined that the two signatures are not a match, i.e. are not authentic. An overlay window 370A is displayed to indicate that the result of authentication is negative and that the voting transaction signature is not likely signed by the same person who signed the standard or registration signature. Optionally, the result of the authentication process may be displayed, e.g., as a percentage representative of the probability $P_s$ determined in the authentication process. An "OK" 372 is provided to remove window 370A and take the user, such as an election official, to the next screen.

Figure 8D:
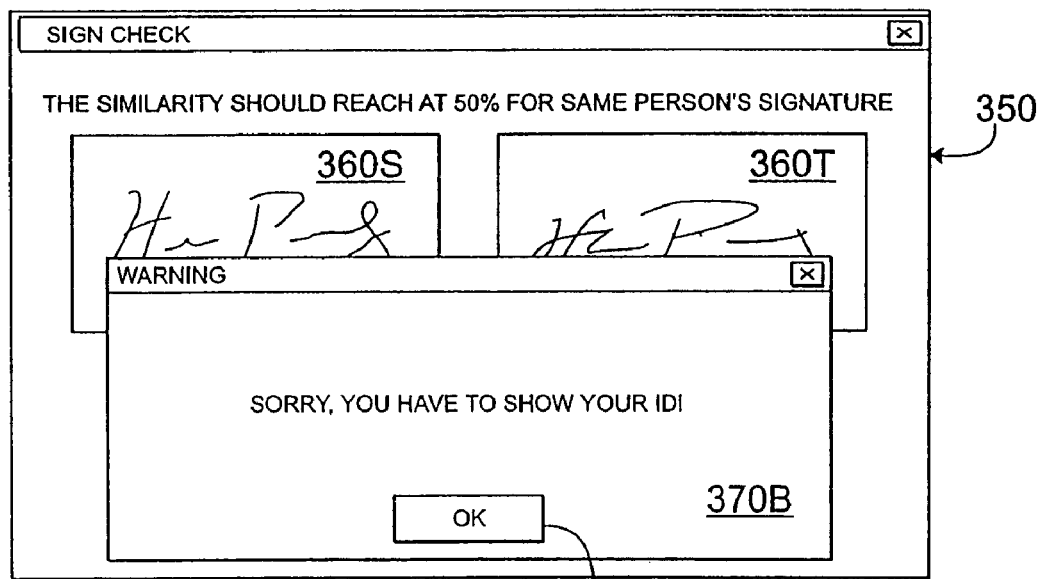

FIG. 8D illustrates screen display 350 after "Compare" button 364 has been activated to initiate comparison of the standard locus-based digitized signature, e.g., collected at registration, and the voting transaction locus-based digitized signature in the case where the authentication process has determined a probability $P_s$ that is too low to indicate that the two signatures are a match and is too high to indicate that the two signatures are not a match, i.e. the voting transaction signature may or may not be authentic. An overlay window 370B is displayed to indicate that the result of authentication is not a positive match and/or that the voting transaction signature may or may not have been signed by the same person who signed the standard or registration signature. Optionally, window 370B may direct further, alternative and/or additional steps, such as for attempting to authenticate the identity of the person seeking to conduct the voting transaction and/or to complete the voting transaction, such as requesting that the person show identification (ID). The result of the authentication process may or may not be displayed, e.g., as a percentage representative of the probability $P_s$ determined in the authentication process. An "OK" button 372 is provided to remove window 370B and take the user, such as an election official, to the next screen.

Figure 9:
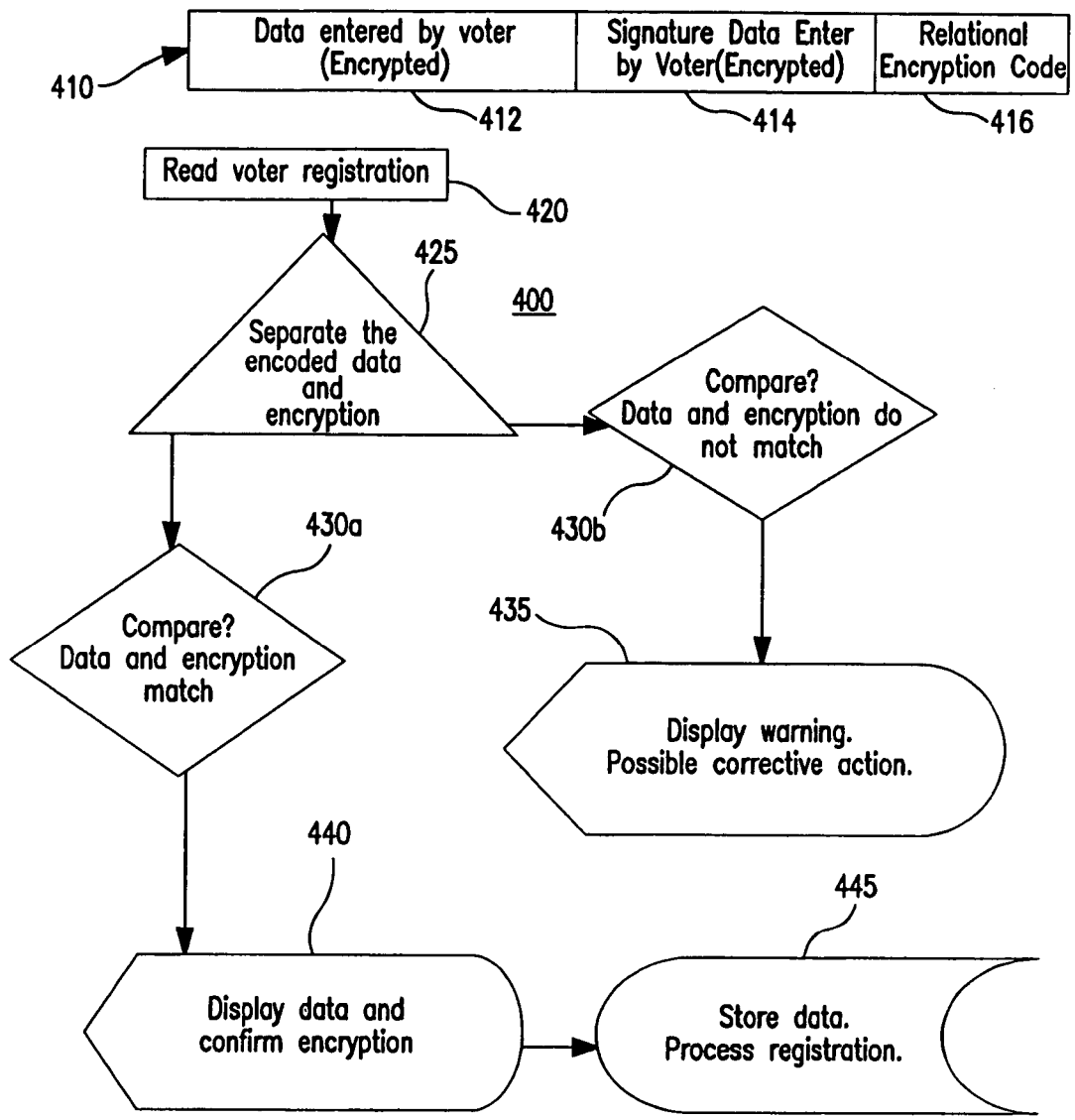
FIG. 9 is a schematic flow diagram illustrating an example of a verification for use with the method of FIGS. 4, 5, 6, and 7.

FIG. 9 is a schematic flow diagram illustrating an example of a verification 400 for use with the method of FIGS. 4, 5, 6, and 7. In method 400, voter registration information entered by the person registering to vote is transmitted as an encrypted voter registration file 410, e.g., an electronic file of a voter registration application form, to the election agency computer. Transmitted file 410 preferably includes the registration information (data) 412 provided by the person registering, a digitized signature 414 signed by the person registering, and a relational check code (encryption code) 416. Preferably, the registration information and/or data 412 is encrypted as is the digitized signature 414, and a relational check code (encryption code) 416 generated and/or derived from the values of the registration information 412 and digitized signature data 414.

Upon or after receipt, voter registration file 410 is read 420 and the encoded registration information 412 and digitized signature data 414 are separated 425 from the relational encryption code 416, and, if encrypted, are decrypted. The validity of the encoded data 412, 414 is then compared 430 to determine whether the data 412 and/or 414 is/are valid relative to encryption code 416. An example of such comparison can include generating a relational encryption code 416' from the value of encoded data 412 and/or 414 using the same algorithm as was utilized to generate relational encryption code 416, and then comparing the read 420, separated 415 relational encryption code 416 with generated relational encryption code 416'.

If comparing 430 indicates a match 430a, then the read 420, separated 425 encoded data 412, 414 is deemed verified and authentic, and may be displayed 440 for confirming the data 412, 414 and/or the relational encryption codes 416, 416', e.g., by an election official. The voter registration is then processed 445 and the registration data is stored 445, e.g., in one or more databases as described. Storing 445 includes storing the information provided by the person registering 412, the digitized signature data 414, and information provided and/or generated in the processing of the registration application 410, which may or may not include a voter identification number (VID#) as described.

If comparing 430 does not indicate a match 430b, then the read 420, separated 425 encoded data 412, 414 is deemed to not be verified and/or not authentic, and so the registration application 410 is not processed to register the person registering. A warning or alert may be displayed 435 to alert an election official for further action. Such further action may include any one or more of displaying the data 412, 414 and/or digitized signature 416 for determining the cause of the warning, for seeking additional information and/or proof of identity from the person registering, and/or for an election official to confirm the data 412, 414 and/or the relational encryption codes 416, 416', and/or for investigation. If the discrepancy (cause of non-match) is identified and cleared, the voter registration application 410 may then be processed 445 as above to register the person to vote.

Figure 10:
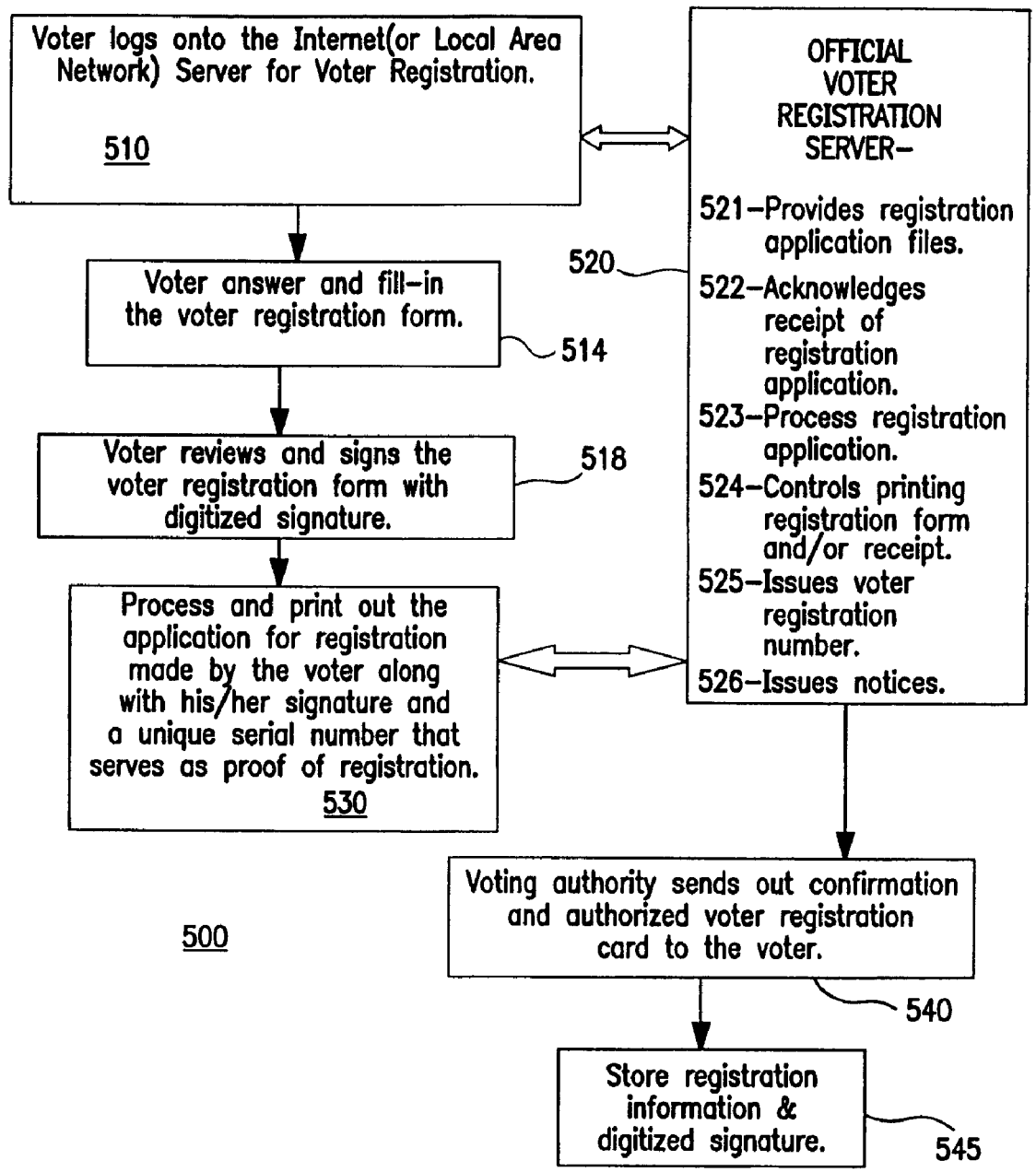
FIG. 10 is a high-level schematic flow diagram illustrating an example of the registration method of FIGS. 4, 5, 6, 7 and 9.

FIG. 10 is a high-level schematic flow diagram illustrating an example of the registration method of FIGS. 4, 5, 6, 7 and 9. Method 500 of FIG. 10 commences by a person seeking to register logging onto 510 the voter registration server maintained by the voter registration agency. Typically, the person may log on 510 using a standard desk-top, laptop, notebook or other computer having an associated signature pad or other signature capturing device, whether the signature device is in addition to a standard keyboard or is integrated with a custom keyboard. Such computer may be located in any location from which connection to the voter registration server may be made via an Intranet, the Internet or any other communication medium.

The voter registration server performs plural steps 521-525 either alone or in cooperation with the computer utilized by the person registering. At least initially, the voter registration server downloads 521 the necessary application files and drivers providing same to the computer utilized by the person registering, if such files and drivers are not already thereon. The person registering completes 514 the electronic voter registration application as by answering questions thereon and/or filling-in information requested, e.g., as requested by the voting jurisdiction. The person registering then reviews and signs 518 the electronic voter registration application using the signature device to provide a digitized signature. The electronic registration application is then submitted and processed 520, 530.

Examples of processing 520, 530 include one or more of acknowledging 522 the receipt of the electronic registration application, processing 523 the electronic registration application including checking it for completeness, initiating and controlling 524 the optional printing 530 of the voter registration application and/or a receipt and/or other confirmation by a local printer associated with the computer utilized by the person registering, optionally issuing 525 and/or printing 530 a voter registration number such as a VID# (either on-line or at a later time), and/or issuing 526 notices and/or messages concerning the registration application and/or process, and the like.

The registration agency may send 540 a confirmation of the person's registration and/or a voter registration card, e.g., by mail so as to confirm that the address provided by the person registering is correct. The voter registration information provided by the person registering and any additional information relating to processing the registration application is stored 545 in a voter registration database and all or part thereof is made available in an electronic voter registration database for use by election officials conducting an election. The registration of the voter is completed when all the necessary steps have been performed.

It is understood that the method and apparatus for registering a registrant, herein described in the example context of registering voters and/or maintaining voting registration records, may find application and/or be employed in many different voting and other transactions and environments. Examples thereof include but are not limited to government and private voter registration, government and private voting, whether by direct connection and/or by network, Internet and other network, and any other where it is desired or necessary to verify the identity of a person with appropriately probability. Examples could also include registration and conduct of labor union elections, union representation elections, corporate elections (such as for shareholder or stockholder voting), corporate governance (such as for director voting), professional and/or learned societies and associations (such as the American Medical Association, American Bar Association, and the like). Examples of other transactions could include medical enrollment, school and educational enrollment and/or registration, insurance, banking, loan registration (application), and other commercial, business and government transactions.

Herein, "transaction" generally refers to any of the foregoing and "person" or "user" or "voter" or "registrant" generally refers to any person or persons making, engaging in or seeking to register and/or enroll and/or apply and/or to make or engage in a transaction. While any particular example or embodiment herein may be described with reference to a particular context, environment or transaction, e.g., voter registration and voting, the apparatus and method are not limited to such contexts, environments and/or transactions.

It is noted that while the voter identification number and/or the relational check code is/are referred to as "numbers," each may include numerical, alphabetic, Alpha-numeric and other characters and symbols, conventional or arbitrary, as may be desired. Information is typically represented and/or stored in a memory in accordance with a predetermined formula or algorithm or other scheme, either on a character by character basis or on the basis of one or more combinations of the characters or values, for example, binary, binary coded decimal, hexadecimal, or any other digital coding representation thereof. Suitable formula and algorithms therefor include, for example, binary, binary coded decimal, other digital coding representations thereof, parity checks or other parity representations, sum checks, field relationship checks or any other predetermined relationship between the stored data or information and the parity or check number or code.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

While the present invention has been described in terms of the foregoing exemplary embodiments, variations within the scope and spirit of the present invention as defined by the claims following will be apparent to those skilled in the art. For example, security for data and information transmitted via networks, the Internet and other communication media may be provided by any one or more of a relational check code or number, public or private key encryption, a 128-bit encryption protocol, or any other encryption and/or data protection scheme, whether more or less secure, whether available presently or in the future.

In addition, where confirmation of the information entered is provided to the person registering and/or voting, final confirmation and/or a printed receipt and/or registration form may be provided only after the information provided has been transmitted to the regional and/or central computer for processing and has been found to be suitable for processing. E.g., such acknowledgment may be an indication that the data file has been received intact and/or may be an indication that the data file has been opened and found to be valid in accordance with a relational check code or other security criteria. Further, the return acknowledgment may be a transmission of the data as received by the regional and/or central computer, and may or may not include a confirmation of matching of the returned data with the data entered as stored on the computer utilized by the person registering and/or voting.

Further, where the voter registration files are downloaded to a computer to be utilized in registering, the files and drivers necessary for operation of one or more models of signature pad or other signature capture device or any other biometric characteristic sensing device, may be downloaded therewith. As a result, for the person seeking to register need only to connect the signature device or other biometric capture device and need not install the device files and drivers. All that is needed is the signature device, and the voter registration system and method automatically selects the drivers for the then present signature device from the available device drivers and configures for that device.

It is noted that the present system and method allows for registration from any computer that has Internet access, whether located in a home, a business, a library, a school, or other public or private location. Additionally, the signature device may be borrowed or checked-out from a library, government office, or other location, and may be connected in place of the mouse device on such computer, whereupon such computer may access the registration web site via the Internet and to download the files and drivers necessary to make the system and perform the method described.

Further, the computer utilized for registration may be continuously connected to the central computer and voter registration database(s) therein or may be periodically connected therewith, either on-line on a demand basis as when a person initiates to register or off-line with periodic connection for downloading registration data and information. Thus, the computer and signature capture device associated therewith may include a voter database and be utilized essentially as a "stand-alone" apparatus, e.g., for a temporary registration place or for a small voting jurisdiction, and such computer may subsequently placed in communication with a central computer having a registration database. Registration information may include an identification number of the computer utilized for registering (and/or of a hard drive, processor, network interface, or other component thereof).

The signature capture device(s) herein may be standard commercially available devices and/or may be specially marked/labeled and/or electronically coded for use with the registration system and method herein. The signature capture device(s) may be utilized in conjunction with a standard computer keyboard or may by integrated with a keyboard, e.g., as in a custom package, if and as desired.

What is claimed is:

1. A method for voter registration comprising:
providing a server in communication with a computer via a communication path including a network, an intranet, the Internet, or a combination thereof,
receiving voter data entered into the computer and communicated to the server,
comparing the communicated voter data to registered voter data stored in at least two data fields of a registered voter database of the server for detecting voter data that may be a duplicate or that may be a change to an existing registration,
comparing the communicated voter data to data stored in at least one other database for detecting a duplicate, or for validating the communicated voter data, or for both detecting a duplicate and validating the communicated voter data, and
responsive to both comparing steps for detecting a duplicate:
if the communicated voter data is not a duplicate, and optionally is validated, then storing the communicated voter data in the registered voter database or storing the communicated voter data for changing the voter data stored in the registered voter database for the existing registration, whereby a voter is registered or an existing voter registration is changed, or
if the communicated voter data is a duplicate or is not validated or both, then not storing the communicated voter data in the registered voter database, whereby a voter is not registered.

2. The method of claim 1 wherein said receiving voter data includes receiving: a digitized voter signature in a graphic image format, a locus-based digitized voter signature captured using a digitizing device coupled to the computer, a voter biometric identifier, or a combination thereof.

3. The method of claim 2 wherein said receiving voter data further includes reducing the size of a record of the entered voter data from that of a gray-scale rich format.

4. The method of claim 3 wherein the size of the record is reduced from about 20-80 kilobytes to about 2-8 kilobytes.

5. The method of claim 2 wherein said digitizing device has a physical feature that indicates where on a signing surface thereof a signature is to be signed.

6. The method of claim 2 wherein the voter biometric identifier includes any one or more of a digitized photo, a facial image, one or more fingerprints, one or more palm prints, hand geometry, facial geometry, a face print, an eye print, a retinal scan, and an iris scan.

7. The method of claim 1 wherein said receiving the voter data includes at least one of receiving voter data that is: protected with a relational check code, associated with a date-time stamp, protected with a relational check code representing the voter data and an associated date-time stamp, encrypted voter data, encrypted voter data and an associated date-time stamp, and encrypted voter data and an associated relational check code.

8. The method of claim 1 wherein the at least two data fields of the registered voter database include any of a characteristic of a locus-based digitized voter signature, a digitized signature, a standard digitized signature associated with the voter, other digitized signatures of the registered voter database, a name, an address, a social security number, and a driver's license number.

9. The method of claim 1 further comprising accessing the registered voter database of the server via a communication path including a network, an intranet, the Internet, or a combination thereof.

10. The method of claim 9 wherein said accessing the registered voter database includes any one or more of:
a registered voter accessing the registered voter database for updating or changing the registered voter's voter data stored therein; and
providing access to the registered voter database for an election official or a poll worker or both at any time authorized.

11. The method of claim 1 wherein the registered voter database includes any one or more of a current voter database, an active voter database, an archive voter database, and an optional pending registration database.

12. The method of claim 1 wherein said receiving voter data comprises receiving information entered using any one or more of a touch screen, a computer monitor, a keyboard, a Braille keyboard, a keyboard having keys with tactile features, a resistive and/or inductive and/or pressure sensitive pad, a computer touch pad, a pocket PC, a Palmtop device, a hand-held device, a personal data assistant (PDA) device, a tablet PC, a camera, a digital imager, a fingerprint reader, a hand print reader, an iris scanner, a retina scanner, a microphone, a sound generating device, audible instructions, a sound synthesizer, a speech synthesizer, a speaker, a headphone, and an earplug speaker.

13. The method of claim 1 wherein the voter data includes any of a digitized signature, a graphic image, a locus-based digitized signature, name, an address, a present address, a previous address, a mailing address, a business address, citizenship, residence, birth date, a birth place, a social security number, a driver's license number, a telephone number, an e-mail address, a political party affiliation, age, prisoner status, and parole status.

14. The method of claim 1 wherein the at least one other database includes a database of any of a motor vehicle department, a health department, the judiciary, and law enforcement.

15. The method of claim 1 wherein the computer comprises one or more of a computer, a local server and a county server, and wherein the server comprises one or more of a central server, a county server, a state server and a national server, and wherein any of the foregoing servers includes a separate server at the same or a different location, wherein the separate servers include dated files or actively updated mirror files or both dated files and actively updated mirror files.

16. A method for voter registration comprising:
providing a server in communication with a computer via a communication path including a network, an intranet, the Internet, or a combination thereof,
receiving voter identifying data entered into the computer and communicated to the server via the communication path,
comparing the communicated voter identifying data to registered voter identifying data stored in at least two data fields of a registered voter database of the server for detecting communicated voter identifying data that may be a duplicate registration or that may be a change or an update to an existing registration,
comparing the communicated voter identifying data to data stored in at least one other database for detecting duplicate registration, or for validating the communicated voter identifying data, or for both detecting duplicate registration and validating the communicated voter identifying data, and responsive to both comparing steps for detecting a duplicate:
if the communicated voter identifying data is not a duplicate registration, is not a change or an update to an existing registration, and optionally is validated, then storing the communicated voter identifying data in the registered voter database, whereby a voter is registered, or
if the communicated voter identifying data is a change or an update to an existing registration, is not a duplicate registration, and optionally is validated, then changing and updating the voter identifying data stored in the registered voter database for the existing registration by storing the communicated voter identifying data in the registered voter database, whereby an existing voter registration is changed and/or updated, or
if the communicated voter identifying data is a duplicate registration or is not validated or both, then not storing the communicated voter identifying data in the registered voter database, whereby a voter is not registered.

17. The method of claim 16 wherein said receiving voter identifying data includes receiving: a digitized voter signature in a graphic image format, a locus-based digitized voter signature captured using a digitizing device coupled to the computer, a voter biometric identifier, or a combination thereof.

18. The method of claim 17 wherein said receiving voter identifying data further includes reducing the size of a record of the entered voter identifying data from that of a gray-scale rich format.

19. The method of claim 18 wherein the size of the record is reduced from about 20-80 kilobytes to about 2-8 kilobytes.

20. The method of claim 17 wherein said digitizing device has a physical feature that indicates where on a signing surface of the digitizing device a signature is to be signed.

21. The method of claim 17 wherein the voter biometric identifier includes any one or more of a digitized photo, a facial image, one or more fingerprints, one or more palm prints, hand geometry, facial geometry, a face print, an eye print, a retinal scan, and an iris scan.

22. The method of claim 16 wherein said receiving the voter identifying data includes at least one of receiving voter identifying data that is: protected with a relational check code, associated with a date-time stamp, protected with a relational check code representing the voter identifying data and an associated date-time stamp, encrypted voter identifying data, encrypted voter identifying data and an associated date-time stamp, and encrypted voter identifying data and an associated relational check code.

23. The method of claim 16 wherein the at least two data fields of the registered voter database include any of a characteristic of a locus-based digitized voter signature, a digitized signature, a standard digitized signature associated with the voter, other digitized signatures of the registered voter database, a name, an address, a social security number, and a driver's license number.

24. The method of claim 16 further comprising accessing the registered voter database of the server via a communication path including a network, an intranet, the Internet, or a combination thereof.

25. The method of claim 24 wherein said accessing the registered voter database includes any one or more of:
a registered voter accessing the registered voter database for updating or changing the registered voter's voter identifying data stored therein; and
providing access to the registered voter database for an election official or a poll worker or both at any time authorized.

26. The method of claim 16 wherein the registered voter database includes any one or more of a current voter database, an active voter database, an archive voter database, and an optional pending registration database.

27. The method of claim 16 wherein said receiving voter identifying data comprises receiving information entered using any one or more of a touch screen, a computer monitor, a keyboard, a Braille keyboard, a keyboard having keys with tactile features, a resistive and/or inductive and/or pressure sensitive pad, a computer touch pad, a pocket PC, a Palmtop device, a hand-held device, a personal data assistant (PDA) device, a tablet PC, a camera, a digital imager, a fingerprint reader, a hand print reader, an iris scanner, a retina scanner, a microphone, a sound generating device, audible instructions, a sound synthesizer, a speech synthesizer, a speaker, a headphone, and an earplug speaker.

28. The method of claim 16 wherein the voter identifying data includes any of a digitized signature, a graphic image, a locus-based digitized signature, name, an address, a present address, a previous address, a mailing address, a business address, citizenship, residence, birth date, a birth place, a social security number, a driver's license number, a telephone number, an e-mail address, a political party affiliation, age, prisoner status, and parole status.

29. The method of claim 16 wherein the at least one other database includes a database of any of a motor vehicle department, a health department, the judiciary, and law enforcement.

30. The method of claim 16 wherein the computer comprises one or more of a computer, a local server and a county server, and wherein the server comprises one or more of a central server, a county server, a state server and a national server, and wherein any of the foregoing servers includes a separate server at the same or a different location, wherein the separate servers include dated files or actively updated mirror files or both dated files and actively updated mirror files.

31. A method for registering a registrant comprising:
   providing a server in communication with a computer via a communication path including a network, an intranet, the Internet, or a combination thereof
   receiving registrant data entered into the computer and communicated to the server,
   comparing the communicated registrant data to registered registrant data stored in at least two data fields of a registered registrant database of the server for detecting registrant data that may be a duplicate or that may be a change to an existing registration,
   comparing the communicated registrant data to data stored in at least one other database for detecting a duplicate, or for validating the communicated registrant data, or for both detecting a duplicate and validating the communicated registrant data, and
   responsive to both comparing steps for detecting a duplicate:
   if the communicated registrant data is not a duplicate, and optionally is validated, then storing the communicated registrant data in the registered registrant database or storing the communicated registrant data for changing the registrant data stored in the registered registrant database for the existing registration, whereby a registrant is registered or an existing registrant registration is changed, or
   if the communicated registrant data is a duplicate or is not validated or both, then not storing the communicated registrant data in the registered registrant database, whereby a registrant is not registered.

32. The method of claim 31 wherein said receiving registrant data includes receiving: a digitized registrant signature in a graphic image format, a locus-based digitized registrant signature captured using a digitizing device coupled to the computer, a registrant biometric identifier, or a combination thereof.

33. The method of claim 32 wherein said receiving registrant data further includes reducing the size of a record of the entered registrant data from that of a gray-scale rich format.

34. The method of claim 33 wherein the size of the record is reduced from about 20-80 kilobytes to about 2-8 kilobytes.

35. The method of claim 32 wherein said digitizing device has a physical feature that indicates where on a signing surface thereof a signature is to be signed.

36. The method of claim 32 wherein the registrant biometric identifier includes any one or more of a digitized photo, a facial image, one or more fingerprints, one or more palm prints, hand geometry, facial geometry, a face print, an eye print, a retinal scan, and an iris scan.

37. The method of claim 31 wherein said receiving the registrant data includes at least one of receiving registrant data that is: protected with a relational check code, associated with a date-time stamp, protected with a relational check code representing the registrant data and an associated date-time stamp, encrypted registrant data, encrypted registrant data and an associated date-time stamp, and encrypted registrant data and an associated relational check code.

38. The method of claim 31 wherein the at least two data fields of the registered registrant database include any of a characteristic of a locus-based digitized registrant signature, a digitized signature, a standard digitized signature associated with the registrant, other digitized signatures of the registered registrant database, a name, an address, a social security number, and a driver's license number.

39. The method of claim 31 further comprising accessing the registered registrant database of the server via a communication path including a network, an intranet, the Internet, or a combination thereof.

40. The method of claim 39 wherein said accessing the registered registrant database includes any one or more of:
   a registered registrant accessing the registered registrant database for updating or changing the registered registrant's registrant data stored therein; and
   providing access to the registered registrant database for an registration official or a registration worker or both at any time authorized.

41. The method of claim 31 wherein the registered registrant database includes any one or more of a current registrant database, an active registrant database, an archive registrant database, and an optional pending registration database.

42. The method of claim 31 wherein said receiving registrant data comprises receiving information entered using any one or more of a touch screen, a computer monitor, a keyboard, a Braille keyboard, a keyboard having keys with tactile features, a resistive and/or inductive and/or pressure sensitive pad, a computer touch pad, a pocket PC, a Palmtop device, a hand-held device, a personal data assistant (PDA) device, a tablet PC, a camera, a digital imager, a fingerprint reader, a hand print reader, an iris scanner, a retina scanner, a microphone, a sound generating device, audible instructions, a sound synthesizer, a speech synthesizer, a speaker, a headphone, and an earplug speaker.

43. The method of claim 31 wherein the registrant data includes any of a digitized signature, a graphic image, a locus-based digitized signature, name, an address, a present address, a previous address, a mailing address, a business address, citizenship, residence, birth date, a birth place, a social security number, a driver's license number, a telephone number, an e-mail address, an affiliation, age, prisoner status, and parole status.

44. The method of claim 31 wherein the at least one other database includes a database of any of a motor vehicle department, a health department, the judiciary, and law enforcement.

45. The method of claim 31 wherein the computer comprises one or more of a computer, a local server and a county server, and wherein the server comprises one or more of a central server, a county server, a state server and a national server, and wherein any of the foregoing servers includes a separate server at the same or a different location, wherein the separate servers include dated files or actively updated minor files or both dated files and actively updated mirror files.

* * * * *